ns10351168B2

(12) United States Patent
Tsubaki

(10) Patent No.: US 10,351,168 B2
(45) Date of Patent: Jul. 16, 2019

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/740,076

(22) PCT Filed: Jul. 25, 2017

(86) PCT No.: PCT/JP2017/026897
§ 371 (c)(1),
(2) Date: Dec. 27, 2017

(87) PCT Pub. No.: WO2018/021325
PCT Pub. Date: Feb. 1, 2018

(65) Prior Publication Data
US 2019/0039647 A1 Feb. 7, 2019

(30) Foreign Application Priority Data

Jul. 28, 2016 (JP) .................................. 2016-148919
Jul. 28, 2016 (JP) .................................. 2016-148926
Jul. 28, 2016 (JP) .................................. 2016-148927

(51) Int. Cl.
B62D 6/08 (2006.01)
B62D 6/00 (2006.01)
(Continued)

(52) U.S. Cl.
CPC .............. B62D 6/00 (2013.01); B62D 1/286 (2013.01); B62D 5/0463 (2013.01); B62D 6/007 (2013.01); B62D 6/008 (2013.01); B62D 15/025 (2013.01)

(58) Field of Classification Search
CPC ........ B62D 6/00; B62D 6/008; B62D 5/0463; B62D 1/286; B62D 15/021; B62D 15/0285; B62D 6/08; B62D 6/04; B62D 5/0493
(Continued)

(56) References Cited

U.S. PATENT DOCUMENTS 9,327,761 B2 * 5/2016 Tsubaki ................ B62D 5/0472
9,637,166 B2 * 5/2017 Tsubaki ................ B62D 1/286
(Continued)

FOREIGN PATENT DOCUMENTS

JP      04-205509 A    7/1992
JP      2002-002519 A    1/2002
(Continued)

OTHER PUBLICATIONS

Written Opinion of the International Searching Authority of PCT/JP2017/026897 dated Aug. 29, 2017.
(Continued)

Primary Examiner — Kira Nguyen
(74) Attorney, Agent, or Firm — Sughrue Mion, PLLC

(57) ABSTRACT

When a steering operation by a driver intervenes during autonomous driving of a vehicle, the intervention operation is fully reflected and a feeling of strangeness and a feeling of discomfort that may be given to the driver are reduced. In order to attain this, an ECU of an electric power steering apparatus includes: a steering angle control section 200 to which a steering angle command value is input to control a steering angle; an assist control section 147 to which an assist map gradual change gain is input to output an assist control output gradual change gain; and a switching determination/gradual change gain generating section 145 that generates a gradual change gain, by which steering angle control output and assist control output are multiplied, and (Continued)

multiplies the gradual change gain to make a switching determination between a steering angle control mode by the steering angle control section 200 and an assist control mode by the assist control section 147. The steering angle control section 200 has a position control section 208, a steering angular velocity control section 212, and steering intervention compensating and steering-wheel vibration suppressing means 220.

24 Claims, 30 Drawing Sheets

(51) Int. Cl.
*B62D 5/04* (2006.01)
*B62D 15/02* (2006.01)
*B62D 1/28* (2006.01)

(58) Field of Classification Search
USPC ..................................................... 701/41–43
See application file for complete search history.

(56) References Cited

U.S. PATENT DOCUMENTS

| | | |
|---|---|---|
| 2001/0054519 A1 | 12/2001 | Nishiwaki et al. |
| 2006/0089770 A1* | 4/2006 | Ito .......................... B62D 1/286 |
| | | 701/41 |
| 2015/0191199 A1 | 7/2015 | Tsubaki et al. |
| 2016/0016606 A1 | 1/2016 | Tsubaki |

FOREIGN PATENT DOCUMENTS

| | | |
|---|---|---|
| JP | 2002-120744 A | 4/2002 |
| JP | 2004-017881 A | 1/2004 |
| JP | 3912279 B2 | 5/2007 |
| JP | 3917008 B2 | 5/2007 |
| JP | 2012-166720 A | 9/2012 |
| JP | 2015-020604 A | 2/2015 |
| WO | 2014/162769 A1 | 10/2014 |

OTHER PUBLICATIONS

International Search Report of PCT/JP2017/026897 dated Aug. 29, 2017.

* cited by examiner

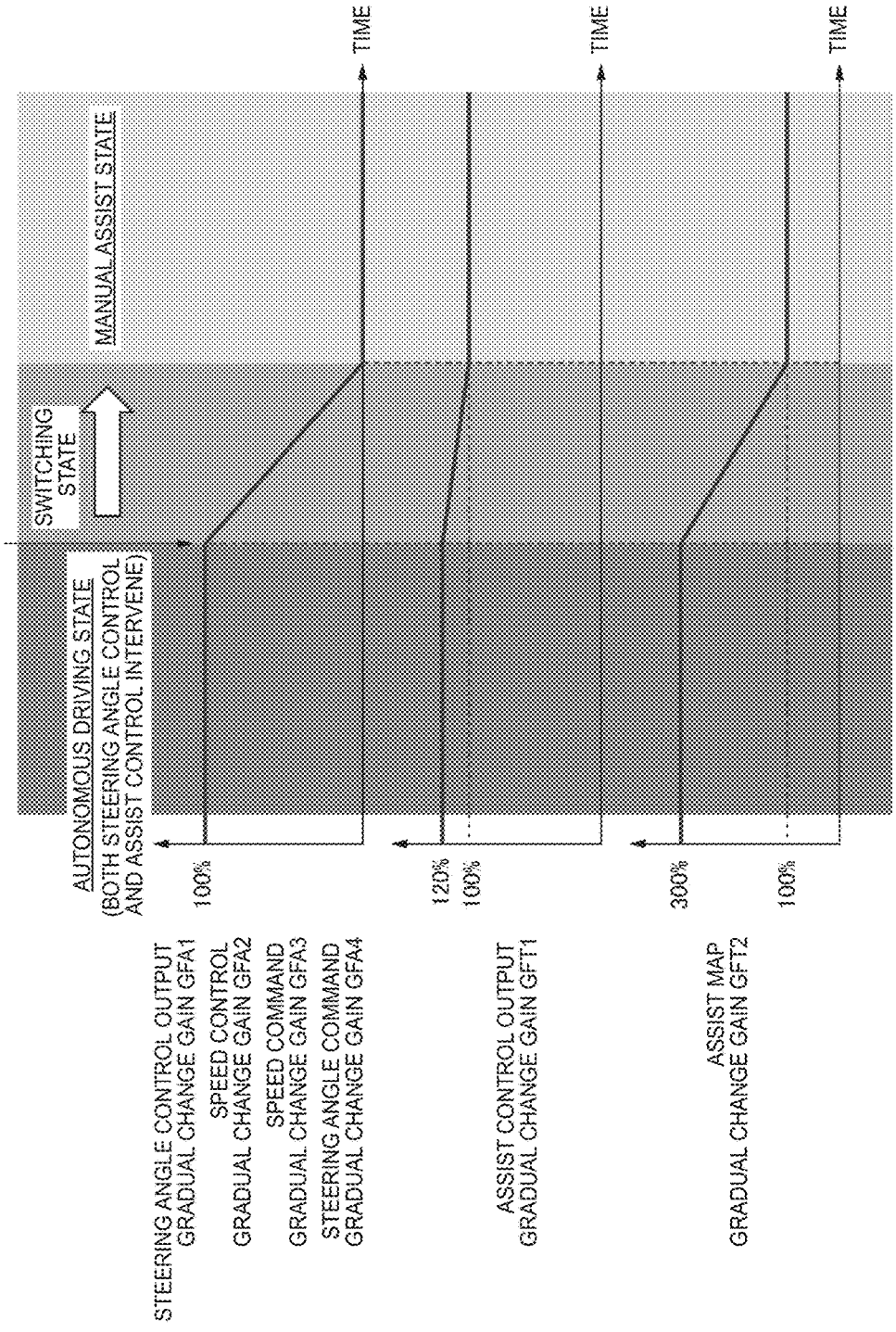

ELECTRIC POWER STEERING APPARATUS

CROSS REFERENCE TO RELATED APPLICATIONS

This application is a National Stage of International Application No. PCT/JP2017/026897 filed Jul. 25, 2017, claiming priority based on Japanese Patent Application No. 2016-148926 filed Jul. 28, 2016, Japanese Patent Application No. 2016-148927 filed Jul. 28, 2016, and Japanese Patent Application No. 2016-148919 filed Jul. 28, 2016, the contents of all of which are incorporated herein by reference in their entirety.

TECHNICAL FIELD

The present invention relates to an electric power steering apparatus.

BACKGROUND ART

Conventionally, an electric power steering (EPS) in an automotive steering system has been proposed and become commercially practical. An electric power steering apparatus configured to generate an auxiliary steering torque using an electric motor according to the steering torque applied to a steering wheel and transmit this auxiliary steering torque to a steering shaft is currently under development. In such an electric power steering apparatus, the motor is connected to the steering shaft through a speed-reduction mechanism so that the rotation of the motor will be transmitted to the steering shaft after being decelerated by the speed-reduction mechanism.

Further, attention on autonomous driving technology to steer a vehicle automatically has been focused in recent years, and various techniques have been developed. When automatic steering is realized in an electric power steering apparatus, structures having steering angle control (to calculate and control a motor electric current command value used to make the steering angle of the steering follow a desired angle) and assist control (to calculate and control a motor electric current command value used to apply an auxiliary steering force (assist) to the steering mechanism using the rotational force of the motor) independently to switch between these outputs are adopted (for example, see Patent Documents 1 to 3).

CITATION LIST

Patent Documents

Patent Document 1: Japanese Patent No. 3912279
Patent Document 2: Japanese Patent No. 3917008
Patent Document 3: Japanese Patent Application Laid-Open No. 2004-017881

SUMMARY

Technical Problem

However, when a steering operation by a driver intervenes during autonomous driving, the intervention operation may not be fully reflected. Further, when the operation intervenes, the driver may have a feeling of strangeness and a feeling of discomfort. The above will be described in detail below.

Problem 1 (Feeling of Strangeness Upon Driver's Intervention During Autonomous Driving, and Compatibility Between Steering Angle Control and Assist Control)

Position and speed control having excellent responsiveness to a steering angle command and disturbance suppression against a road surface reaction force and the like is used for steering angle control. For example, P control (proportional control) is used in a position control section and PI control (proportional-integral control) is used in a speed control section. Suppose that command values as respective outputs of steering angle control and assist control are switched. In this case, for example, when abrupt switching is done by driver's switch input, the command values change abruptly to make the behavior of the steering wheel unnatural, giving the driver a feeling of strangeness. Therefore, a technique to multiply the steering angle control command value and the assist control command value by respective gradual change gains (gradually changing gains) so as to switch between the outputs gradually in order to suppress the abrupt change in electric current command value is used (see Patent Document 3, or the like).

However, in this technique, since the steering angle control command value is restricted by the gradual change gain during switching and output to the electric current command value, the output of the electric current command value becomes smaller than the steering angle control command value by a restricted amount. Since this restriction slows down the actual speed of the motor compared with a steering angular velocity command value, a deviation is generated between the steering angular velocity command value and the actual speed, and hence integral values of I control (integral control) in the speed control are accumulated, thereby outputting a further large steering angle control command value from the speed control. As a result, in such a state that the gradual change gain for the assist control command value grows gradually larger, the restriction by the gradual change gain is relaxed. Therefore, the steering angle control command value becomes an excess value as the gradual change gain grows larger to make the steering wheel respond excessively to the steering angular velocity command value in such a sense that the steering wheel gets caught, giving the driver a feeling of strangeness and a feeling of discomfort.

Problem 2

In the first place, in a method according to the related art technique including the above problem 1 (for example, see Patent Document 3), P control is performed on the steering angle deviation and PI control is performed for speed control. When there is an intervention of manual input by the driver during steering angle control, steering angle control naturally operates to follow the steering angle command value, and this makes it difficult to turn the steering wheel manually until the "switching operation" from steering angle control to assist control is carried out. Further, since a time delay is generated by the "manual input detection" and "switching operation," the intervention of a steering operation by the driver may not be fully performed.

It is an object of the present invention to provide an electric power steering apparatus capable of fully reflecting an intervention operation when a steering operation by a driver intervenes during autonomous driving of a vehicle, and reducing a feeling of strangeness and a feeling of discomfort given to the driver when the operation intervenes.

Solution to Problem

In order to solve the above problems, the present invention provides an electric power steering apparatus including:
a motor that applies a steering assist force to a steering of a vehicle; and
an ECU that generates a control signal for the steering according to a steering angle command value calculated based on a target trajectory of the vehicle, where
the motor is driven by the steering angle command value to perform assist control on the steering of the vehicle, and mutually switch between an automatic steering control mode and a manual steering control mode,
wherein the ECU includes:
a steering angle control section to which the steering angle command value is input to control a steering angle of the steering;
an assist control section to which an assist map gradual change gain is input to output an assist control output gradual change gain; and
a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and
the steering angle control section includes:
a position control section that multiplies a deviation between a target steering angle θt and an actual steering angle θr of the steering by a proportional gain, and further calculates a steering angular velocity command value ωref using an FF filter;
a steering angular velocity control section that calculates, by PI control using a pseudo-integration, an electric current command value for the motor based on input target steering angular velocity ωt and actual steering angular velocity ωr to make the actual steering angular velocity ωr follow the target steering angular velocity ωt; and
steering intervention compensating and steering-wheel vibration suppressing means that outputs, based on a steering torque upon driver's steering intervention, an electric current command value in a direction to release a twist of a torsion bar of the steering due to the steering intervention.

According to the electric power steering apparatus having the above configuration, steering intervention without a feeling of strangeness can be realized during autonomous driving of the vehicle even when there are no "manual input detection" and "switching operation." The feeling of strangeness such as a sense of getting caught upon steering intervention can also be reduced, and further such switching operation from steering angle control to assist control can be realized while suppressing the feeling of strangeness.

It is preferred that the steering angle control section in the electric power steering apparatus should further have steering-wheel vibration removing means that reduces a vibrational frequency component using a filter that reduces a steering-wheel vibrational frequency component, or by phase-lag compensation.

In a conventional typical technique (for example, see Patent Document 2), steering angle follow-up control using P control in the position control section and speed PI control in the speed control section is performed. When steering angle control is performed on a vehicle, since disturbance and load status vary significantly due to changes in traveling vehicle speed, friction, road surface reaction force, and the like, the control configuration must have a tolerance for the variations. However, for example, when the road surface reaction force changes, or when the target steering angle changes quickly, vibration is generated by a spring and inertial system of the steering wheel in the configuration using conventional control technology alone, and it is quite possible that the driver feels the vibration as a feeling of strangeness and a feeling of discomfort (Problem 3). In contrast, according to the electric power steering apparatus as described above, steering-wheel vibration suppression during automatic steering can be achieved by using the steering-wheel vibration removing means and the steering intervention compensating and steering-wheel vibration suppressing means.

It is also preferred that the steering angle control section should further have an upper and lower limit variable limiter that limits a steering angular velocity command value ωref until the completion of gradual change.

In a conventional typical technique (for example, see Patent Document 1), there is proposed a technique to perform control to increase the steering angular velocity gradually at the start of steering angle control in order to reduce the feeling of strangeness given to the driver due to the abrupt change in steering wheel at the start. In this technique, however, since the steering angular velocity continues to increase until reaching an upper limit value at the beginning of gradual change, integral values of I control are accumulated excessively. As a result, the steering angle control command value becomes an excess value as the gradual change gain grows larger to make the steering wheel respond excessively to the steering angular velocity command value, giving the driver a feeling of strangeness (Problem 4). In contrast, according to the electric power steering apparatus as described above, the upper and lower limit variable limiter, and further steering angle control output gradual change gain, and speed command gradual change gain are used to reduce the above feeling of strangeness given to the driver.

The ECU may have the switching determination/gradual change gain generating section multiply a signal in the steering angular velocity control section by a speed control gradual change gain output to the steering angle control section.

Further, the ECU may have the switching determination/gradual change gain generating section multiply the steering angular velocity command value ωref by the speed command gradual change gain output to the steering angle control section.

The steering angle control section may further have a variable rate limiter that performs rate limit processing on the steering angle command value to avoid an abrupt change in steering angle control electric current command value as steering angle control output due to an abrupt change in the steering angle command value θref.

Further, the ECU may have the switching determination/gradual change gain generating section multiply a steering angle command value from the variable rate limiter by the steering angle command gradual change gain output to the steering angle control section.

In the electric power steering apparatus, the ECU may further have the assist control section to which the assist map gradual change gain is input to output assist control output and multiply the output of the assist control section by an assist control output gradual change gain GFT1.

In order to solve the above problems, the present invention provides an electric power steering apparatus including:

a motor that applies a steering assist force to a steering of a vehicle; and an ECU that generates a control signal for the steering according to a steering angle command value calculated based on a target trajectory of the vehicle, where the motor is driven by the steering angle command value to perform assist control on the steering of the vehicle, and mutually switch between an automatic steering control mode and a manual steering control mode, wherein the ECU includes:

a steering angle control section to which the steering angle command value is input to control a steering angle of the steering;

an assist control section that applies an auxiliary steering force to the steering using a rotational force of the motor; and a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and the steering angle control section includes:

a position control section that multiplies a deviation between a target steering angle θt and an actual steering angle θr of the steering by a proportional gain, and further calculates a steering angular velocity command value ωref using an FF filter;

a steering angular velocity control section that calculates, by control using a proportional gain Kv and phase-lag compensation, an electric current command value for the motor based on an input target steering angular velocity ωt and an actual steering angular velocity ωr to make the actual steering angular velocity ωr follow the target steering angular velocity ωt; and steering intervention compensating and steering-wheel vibration suppressing means that outputs, based on a steering torque upon driver's steering intervention, an electric current command value in a direction to release a twist of a torsion bar of the steering due to the steering intervention.

According to the electric power steering apparatus having the above configuration, steering intervention without a feeling of strangeness can be realized during autonomous driving of the vehicle even when there are no "manual input detection" and "switching operation." The feeling of strangeness such as a sense of getting caught upon steering intervention can also be reduced, and further such switching operation from steering angle control to assist control can be realized while suppressing the feeling of strangeness.

It is preferred that the steering angle control section in the electric power steering apparatus should further have steering-wheel vibration removing means that reduces a vibrational frequency component using a filter that reduces a steering-wheel vibrational frequency component, or by phase-lag compensation.

In the conventional typical technique (for example, see Patent Document 2), steering angle follow-up control using P control in the position control section and speed PI control in the speed control section is performed. When steering angle control is performed on a vehicle, since disturbance and load status vary significantly due to changes in traveling vehicle speed, friction, road surface reaction force, and the like, the control configuration must have a tolerance for the variations. However, for example, when the road surface reaction force changes, or when the target steering angle changes quickly, vibration is generated by a spring and inertial system of the steering wheel in the configuration using conventional control technology alone, and it is quite possible that the driver feels the vibration as a feeling of strangeness and a feeling of discomfort (Problem 3). In contrast, according to the electric power steering apparatus as described above, steering-wheel vibration suppression during automatic steering can be achieved by using the steering-wheel vibration removing means and the steering intervention compensating and steering-wheel vibration suppressing means.

It is also preferred that the steering angle control section should further have an upper and lower limit variable limiter that limits the steering angular velocity command value ωref until the completion of gradual change.

In the conventional typical technique (for example, see Patent Document 1), there is proposed a technique to perform control to increase the steering angular velocity gradually at the start of steering angle control in order to reduce the feeling of strangeness given to the driver due to the abrupt change in steering wheel at the start. In this technique, however, since the steering angular velocity continues to increase until reaching an upper limit value at the beginning of gradual change, integral values of I control are accumulated excessively. As a result, the steering angle control command value becomes an excess value as the gradual change gain grows larger to make the steering wheel respond excessively to the steering angular velocity command value, giving the driver a feeling of strangeness (Problem 4). In contrast, according to the electric power steering apparatus as described above, the upper and lower limit variable limiter, and further steering angle control output gradual change gain, and speed command gradual change gain are used to reduce the above feeling of strangeness given to the driver.

The ECU may have the switching determination/gradual change gain generating section multiply a signal in the steering angular velocity control section by a speed control gradual change gain output to the steering angle control section.

Further, the ECU may have the switching determination/gradual change gain generating section multiply the steering angular velocity command value ωref by the speed command gradual change gain output to the steering angle control section.

The steering angle control section may further have a variable rate limiter that performs rate limit processing on the steering angle command value to avoid an abrupt change in steering angle control electric current command value as steering angle control output due to an abrupt change in the steering angle command value θref.

Further, the ECU may have the switching determination/gradual change gain generating section multiply a steering angle command value from the variable rate limiter by the steering angle command gradual change gain output to the steering angle control section.

In the electric power steering apparatus, the ECU may further have the assist control section to which the assist map gradual change gain is input to output assist control output and multiply the output of the assist control section by an assist control output gradual change gain GFT1.

In order to solve the above problems, the present invention provides an electric power steering apparatus including:

a motor that applies a steering assist force to a steering of a vehicle; and an ECU that generates a control signal for the steering according to a steering angle command value calculated based on a target trajectory of the vehicle, where the motor is driven by the steering angle command value to perform assist control on the steering of the vehicle, and mutually switch between an automatic steering control mode and a manual steering control mode, wherein the ECU includes:

a steering angle control section to which the steering angle command value is input to control a steering angle of the steering;

an assist control section that applies an auxiliary steering force to the steering using a rotational force of the motor; and a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and the steering angle control section includes:

a position control section that multiplies a deviation between a target steering angle θt and an actual steering angle θr of the steering by a proportional gain, and further calculates a steering angular velocity command value ωref using an FF filter;

a steering angular velocity control section that calculates, by proportional control, an electric current command value for the motor based on input target steering angular velocity ωt and actual steering angular velocity ωr to make the actual steering angular velocity ωr follow the target steering angular velocity ωt; and steering intervention compensating and steering-wheel vibration suppressing means that outputs, based on a steering torque upon driver's steering intervention, an electric current command value in a direction to release a twist of a torsion bar of the steering due to the steering intervention.

According to the electric power steering apparatus having the above configuration, steering intervention without a feeling of strangeness can be realized during autonomous driving of the vehicle even when there are no "manual input detection" and "switching operation." The feeling of strangeness such as a sense of getting caught upon steering intervention can also be reduced, and further such switching operation from steering angle control to assist control can be realized while suppressing the feeling of strangeness.

It is preferred that the steering angle control section in the electric power steering apparatus should further have steering-wheel vibration removing means that reduces a vibrational frequency component using a filter that reduces a steering-wheel vibrational frequency component, or by phase-lag compensation.

In the conventional typical technique (for example, see Patent Document 2), steering angle follow-up control using P control in the position control section and speed PI control in the speed control section is performed. When steering angle control is performed on a vehicle, since disturbance and load status vary significantly due to changes in traveling vehicle speed, friction, road surface reaction force, and the like, the control configuration must have a tolerance for the variations. However, for example, when the road surface reaction force changes, or when the target steering angle changes quickly, vibration is generated by a spring and inertial system of the steering wheel in the configuration using conventional control technology alone, and it is quite possible that the driver feels the vibration as a feeling of strangeness and a feeling of discomfort (Problem 3). In contrast, according to the electric power steering apparatus as described above, steering-wheel vibration suppression during automatic steering can be achieved by using the steering-wheel vibration removing means and the steering intervention compensating and steering-wheel vibration suppressing means.

It is also preferred that the steering angle control section should further have an upper and lower limit variable limiter that limits the steering angular velocity command value ωref until the completion of gradual change.

In the conventional typical technique (for example, see Patent Document 1), there is proposed a technique to perform control to increase the steering angular velocity gradually at the start of steering angle control in order to reduce the feeling of strangeness given to the driver due to the abrupt change in steering wheel at the start. In this technique, however, since the steering angular velocity continues to increase until reaching an upper limit value at the beginning of gradual change, integral values of I control are accumulated excessively. As a result, the steering angle control command value becomes an excess value as the gradual change gain grows larger to make the steering wheel respond excessively to the steering angular velocity command value, giving the driver a feeling of strangeness (Problem 4). In contrast, according to the electric power steering apparatus as described above, the upper and lower limit variable limiter, and further steering angle control output gradual change gain, and speed command gradual change gain are used to reduce the above feeling of strangeness given to the driver.

The ECU may have the switching determination/gradual change gain generating section multiply a signal in the steering angular velocity control section by a speed control gradual change gain output to the steering angle control section.

Further, the ECU may have the switching determination/gradual change gain generating section multiply the steering angular velocity command value ωref by the speed command gradual change gain output to the steering angle control section.

The steering angle control section may further have a variable rate limiter that performs rate limit processing on the steering angle command value to avoid an abrupt change in steering angle control electric current command value as steering angle control output due to an abrupt change in the steering angle command value θref.

Further, the ECU may have the switching determination/gradual change gain generating section multiply a steering angle command value from the variable rate limiter by the steering angle command gradual change gain output to the steering angle control section.

In the electric power steering apparatus, the ECU may further have the assist control section to which the assist map gradual change gain is input to output assist control output and multiply the output of the assist control section by an assist control output gradual change gain GFT1.

Advantageous Effects of Invention

According to the present invention, when a steering operation by a driver intervenes during autonomous driving of a vehicle, the intervention operation can be fully reflected, and a feeling of strangeness and a feeling of discomfort, which may be given to the driver when the operation intervenes, can be reduced.

BRIEF DESCRIPTION OF DRAWINGS

FIG. 6B is a graph for describing a transition to assist control after the manual input determination of each gradual change gain.

DESCRIPTION OF EMBODIMENTS

Figure 1:
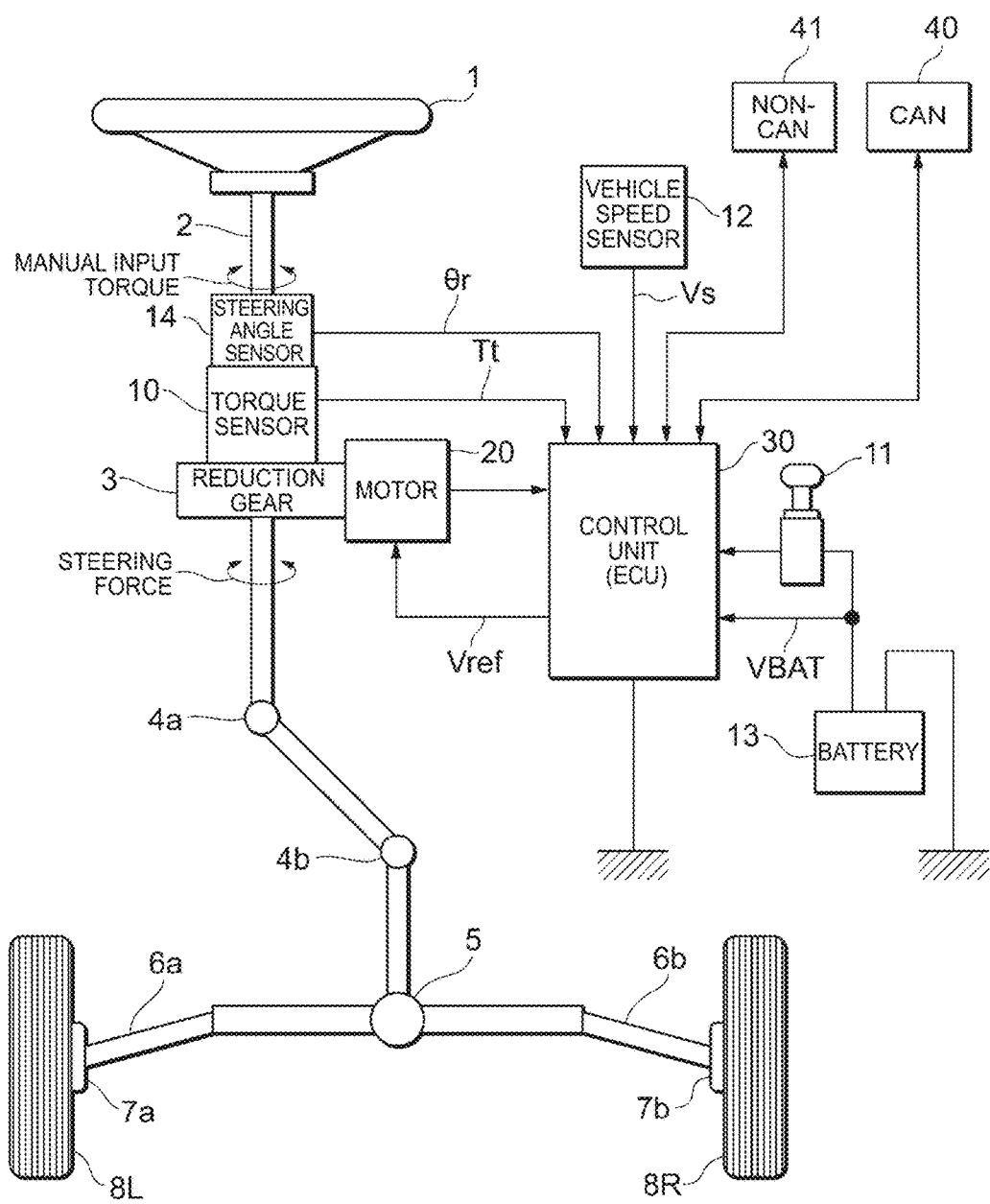
FIG. 1 is a configuration diagram illustrating an outline of an electric power steering apparatus.

A preferred embodiment of an electric power steering apparatus according to the present invention will be described below with reference to the accompanying drawings (see FIG. 1, and the like). Note that components having substantially the same functional configuration in this specification and drawings are given to the same reference numerals to omit redundant description.

A typical configuration of an electric power steering apparatus 100 will be illustrated and described (see FIG. 1). A column shaft (steering shaft) 2 of a steering wheel 1 is connected to steered wheels 8L, 8R via a reduction gear 3, universal joints 4a, 4b, a pinion-rack mechanism 5, and tie rods 6a, 6b, and further through hub units 7a, 7b. A torsion bar and a steering wheel shaft are arranged on the same axis as the column shaft 2.

Further, a steering angle sensor 14 that detects a steering angle θr of the steering wheel 1 and a torque sensor 10 that detects a steering torque Tt are provided around the column shaft 2, and a motor 20 that assists a steering force of the steering wheel 1 is connected to the column shaft 2 through the reduction gear 3.

To a control unit (ECU) 30 that controls the electric power steering apparatus 100, electric power is supplied from a battery 13, and an ignition key signal IG is input via an ignition key 11. The control unit 30 calculates an electric current command value for assist control based on the steering torque Tt detected by the torque sensor 10 and a vehicle speed Vs detected by a vehicle speed sensor 12 to control electric current supplied to the motor 20 by a voltage control command value Vref obtained by compensating for the electric current command value. Although the steering angle θr is detected from the steering angle sensor 14, it can also be obtained from a rotation sensor connected to the motor 20.

A CAN (Controller Area Network) 40 used to exchange a variety of information on the vehicle is connected to the control unit 30, and the vehicle speed Vs can also be received from the CAN 40. Further, a non-CAN 41 used to exchange any communication other than the CAN 40, analog/digital signals, electromagnetic waves. and the like is also connectable to the control unit 30.

Figure 2:
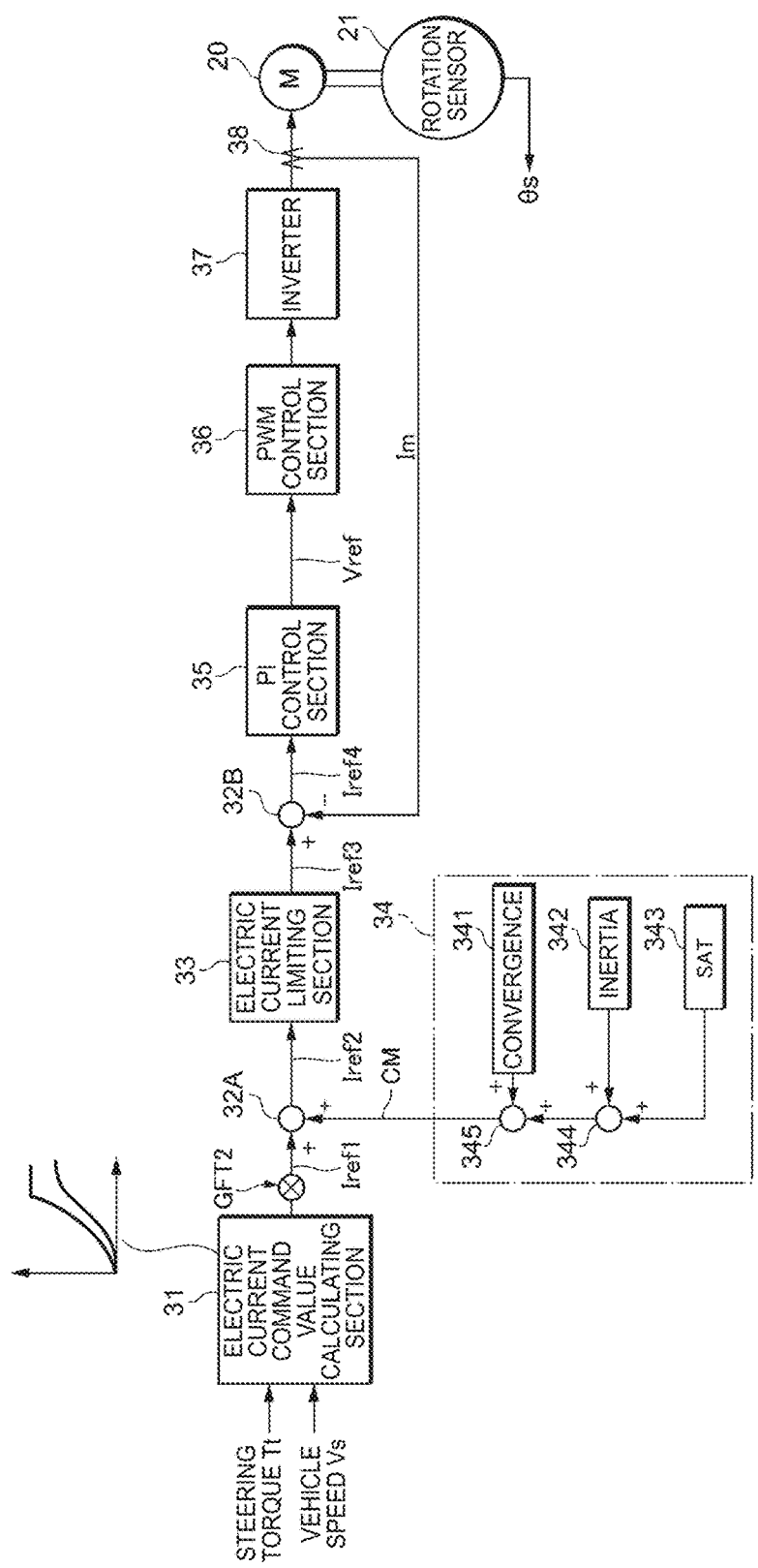
FIG. 2 is a block diagram illustrating a configuration example of a control system of the electric power steering apparatus together with an example of assist map output current.

The control unit 30 is composed mainly of a CPU (including an MPU or an MCU), and typical functions executed by a program inside the CPU are illustrated in FIG. 2.

The functions and operation of the control unit 30 will be described with reference to FIG. 2. The steering torque Tt detected by the torque sensor 10 and the vehicle speed Vs detected by the vehicle speed sensor 12 (or from the CAN 40) are input to an electric current command value calculating section 31 that calculates an electric current command value Iref1. Using an assist map or the like based on the input steering torque Tt and vehicle speed vs, the electric current command value calculating section 31 calculates the electric current command value Iref1 as a control target value for the electric current supplied to the motor 20.

Figure 28:
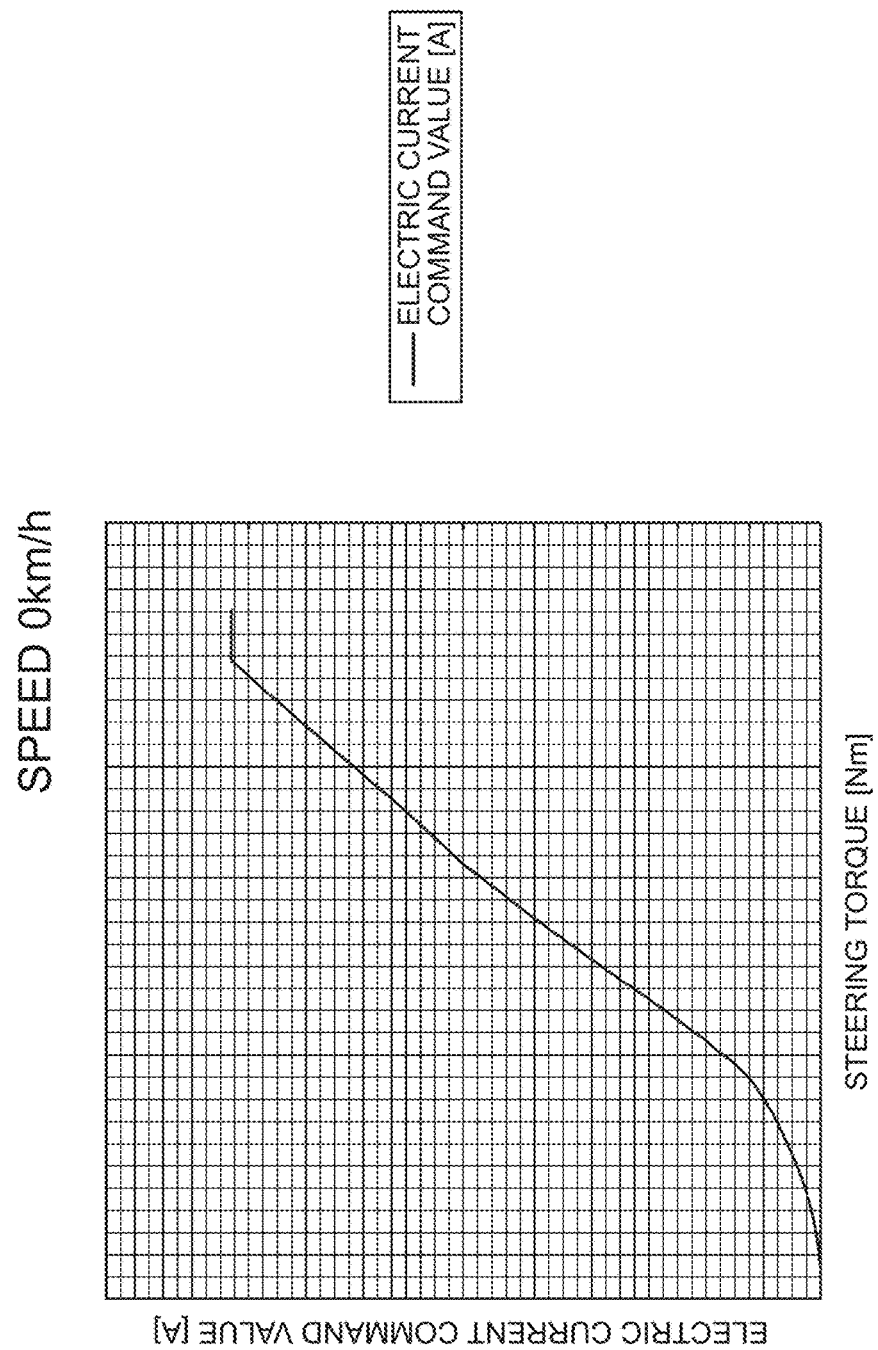
FIG. 28 is a graph illustrating an example of an assist map (at a speed of 0 km/h).
Figure 29:
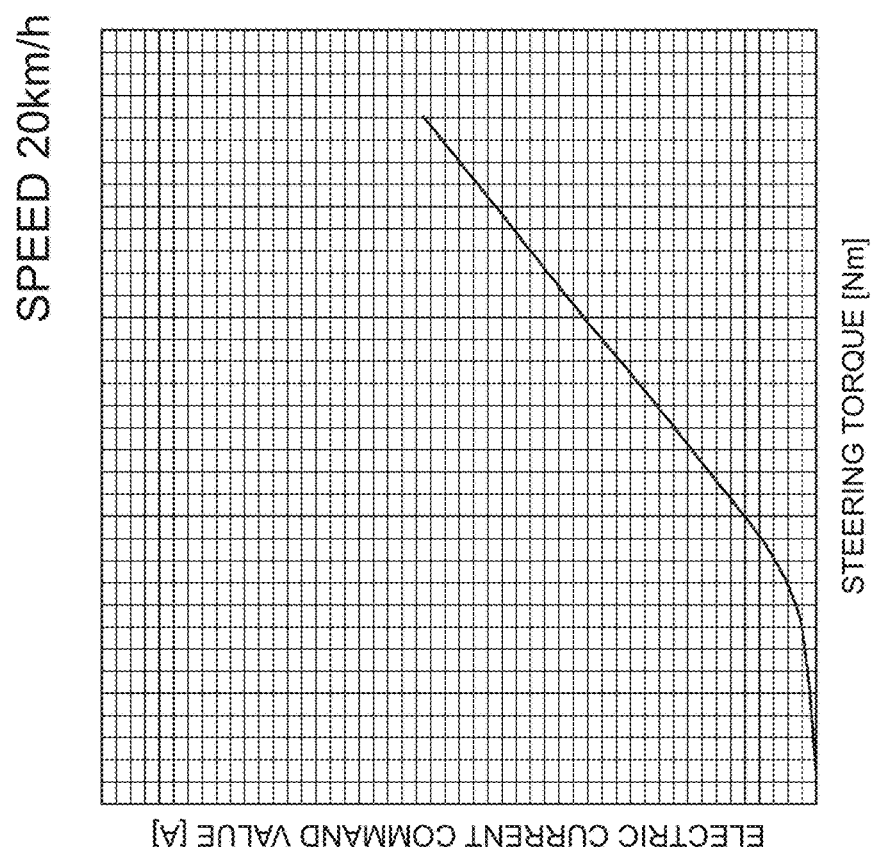
FIG. 29 is a graph illustrating an example of the assist map (at a speed of 20 km/h).
Figure 30:
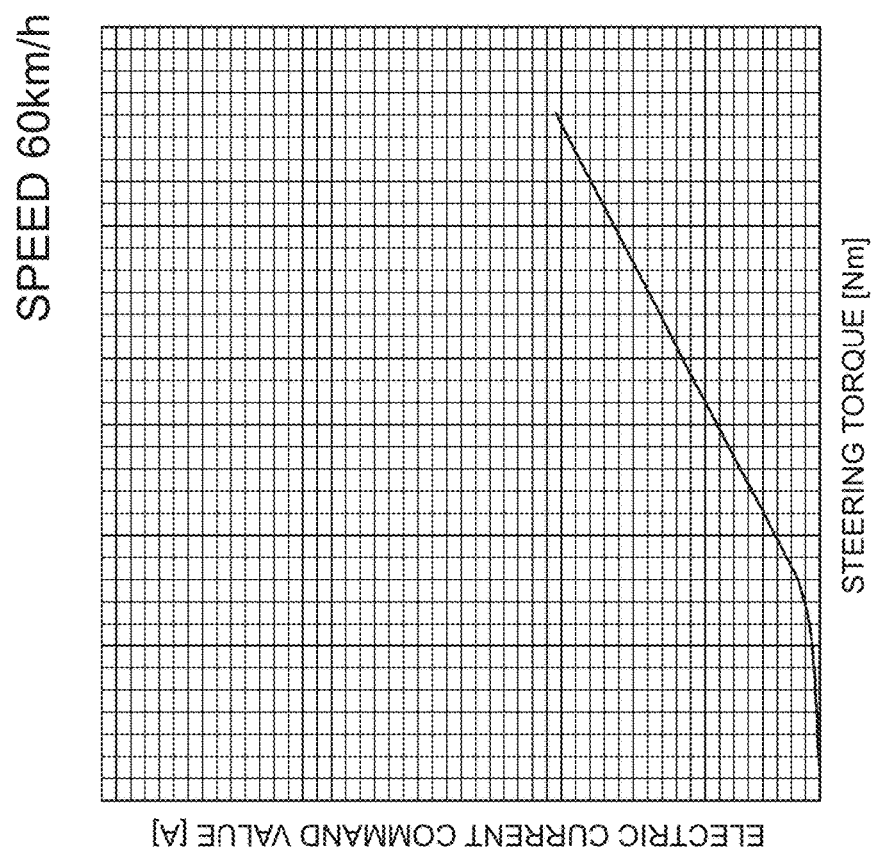
FIG. 30 is a graph illustrating an example of the assist map (at a speed of 60 km/h).

The assist map is information indicative of a correspondence relationship between steering torques and auxiliary steering command values (electric current values), and the "electric current command value" in graphs illustrated in FIG. 28 to FIG. 30 corresponds to the assist map. For example, the assist map includes information indicative of a correspondence relationship between steering torques and auxiliary steering command values in each of low-speed, mid-speed, and high-speed ranges. The information indicative of the correspondence relationship may be represented by plural linear function parameters or expressed by a high-degree polynomial.

The electric current command value Iref1 is input to an electric current limiting section 33 via an addition section 32A, an electric current command value Iref3 with the maximum electric current limited under the overheat protection condition is input to a subtraction section 32B, a deviation Iref4 (=Iref3−Im) from a fed-back motor electric current value Im is calculated, and the deviation Iref4 is input to a PI control section 35 to improve the characteristics of the steering operation. A voltage control command value Vref as a result of improving the characteristics in the PI control section 35 is input to a PWM control section 36, and further the motor 20 is PWM driven through an inverter 37 as a drive section. The electric current value Im of the motor 20 is detected by a motor current detector 38, and fed back to the subtraction section 32B.

Further, a rotation sensor 21 such as a resolver is connected to the motor 20 to detect an actual steering angle θs. A compensation signal CM from a compensation section 34 is added to the addition section 32A, and the addition of the compensation signal CM makes system-based compensation to improve convergence, inertial characteristics, and the like. The compensation section 34 adds self-aligning torque (SAT) 343 and inertia 342 in an addition section 344, and further adds convergence 341 to the addition result in an addition section 345 to set the addition result of the addition section 345 as the compensation signal CM.

In recent years, efforts to use cameras, laser radars, or the like mounted in a vehicle for automatic braking to stop safely and assistance in autonomous driving have been made. As the assistance in autonomous driving, for example, the electric power steering apparatus uses a torque sensor to detect a steering torque input by a driver using the steering wheel or any other device, and uses the information for control switching in the vehicle or the electric power steering apparatus to release the assistance in autonomous driving to return to normal assist control (manual steering control).

Figure 3:
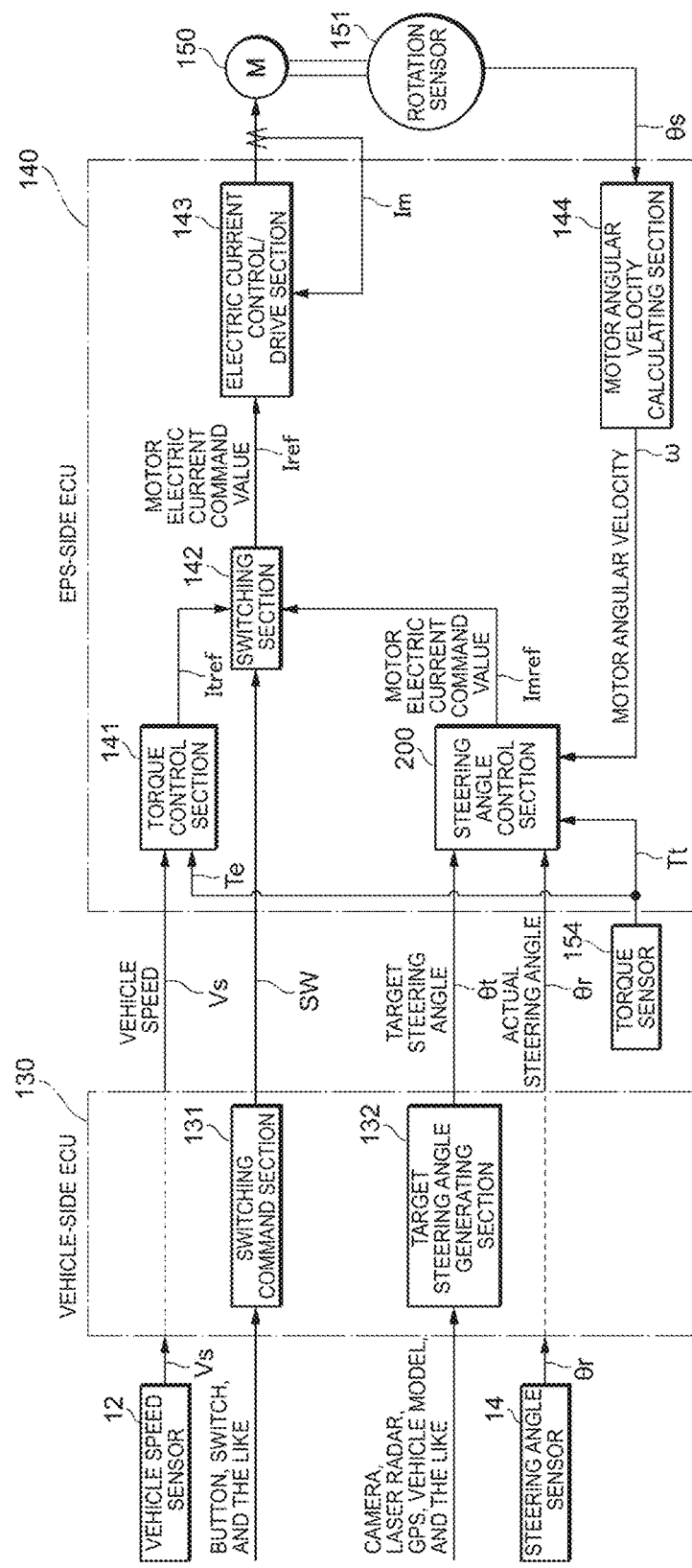
FIG. 3 is a block diagram illustrating an example of an electric power steering apparatus having a switching function between an automatic steering control mode and a manual steering control mode.

Referring first to FIG. 3, a typical electric power steering apparatus 100 as the electric power steering apparatus on which the present invention is premised, i.e., having the functions of an automatic steering control mode and a manual steering control mode, and the function of switching between the steering control modes will be described.

A rotation sensor 151 such as a resolver to detect a motor rotation angle θs is connected to a motor 150 to control the driving of the motor 150 through a vehicle-side ECU 130 and an EPS (electric power steering apparatus) side ECU 140. The vehicle-side ECU 130 includes a switching command section 131 that outputs a switching command SW to automatic steering control or manual steering control based on a button, a switch, or the like indicating the driver's intention, and a target steering angle generating section 132 that generates a target steering angle θt based on signals from the cameras (images) or laser radars. Further, the actual steering angle θr detected by the steering angle sensor 14 provided around the column shaft (steering shaft, steering wheel shaft) is input to a steering angle control section 200 inside the EPS-side ECU 140 via the vehicle-side ECU 130.

The switching command section 131 outputs a switching command SW based on a signal that identifies entering automatic steering control, such as a button or a switch provided around a dashboard or the steering wheel to indicate driver's intention, or a vehicle state signal from a parking mode provided in a shift, and inputs the switching command SW to a switching section 142 inside the EPS-side ECU 140. Further, the target steering angle generating section 132 generates the target steering angle θt using a known technique based on data from the cameras (images) or laser radars, and inputs the generated target steering angle θt to the steering angle control section 200 inside the EPS-side ECU 140.

The EPS-side ECU 140 includes a torque control section 141 that outputs a motor electric current command value Itref calculated based on the steering torque Tt and the vehicle speed Vs, the steering angle control section 200 that calculates and outputs a motor electric current command value Imref for steering angle automatic control based on the target steering angle θt, the actual steering angle θr, a motor angular velocity ω, and the steering torque Tt, the switching section 142 that switches between the motor electric current command values Itref and Imref according to the switching command SW, an electric current control/drive section 143 that performs drive control of the motor 150 based on the motor electric current command value Iref (=Itref or Imref) from the switching section 142, and a motor angular velocity calculating section 144 that calculates the motor angular velocity ω based on the motor rotation angle θs from the rotation sensor 151. Based on the switching command SW from the switching command section 131 of the vehicle-side ECU 130, the switching section 142 switches between a torque control mode (manual steering control) by the torque control section 141 and a position and speed control mode (automatic steering control) by the steering angle control section 200 to output the motor electric current command value Itref in the manual steering control or the motor electric current command value Imref in the automatic steering control. The electric current control/drive section 143 is composed of a PI current control section, a PWM control section, an inverter, and the like.

Figure 4:
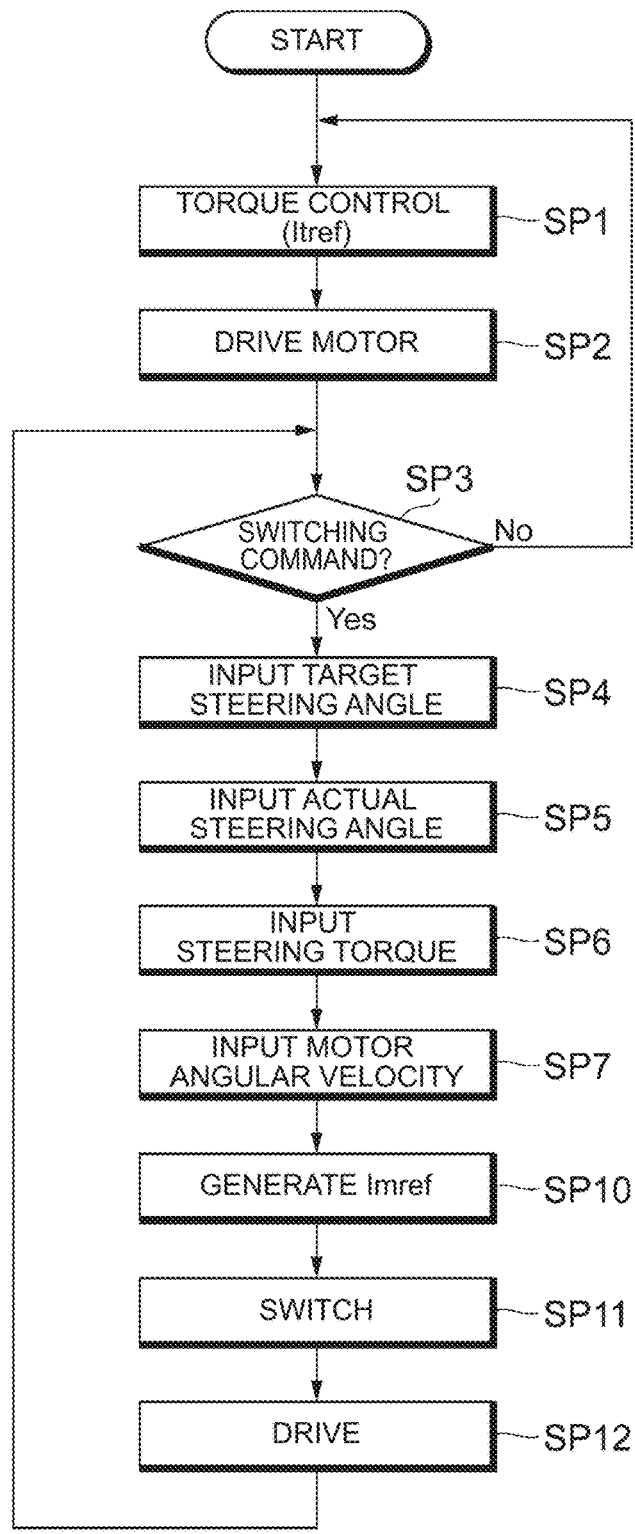
FIG. 4 is a flowchart illustrating a general operation example of the electric power steering apparatus having the switching function between the automatic steering control mode and the manual steering control mode.

A schematic operation example in such a configuration will be described with reference to a flowchart (see FIG. 4).

When the operation of the steering system is started, torque control (manual steering control mode) by the torque control section 141 is first performed (step SP1), and the motor 150 is driven by the electric current control/drive section 143 using the motor electric current command value Itref (step SP2). The above manual steering operation is repeated until a switching command SW to automatic steering control is output from the switching command section 131 (step SP3).

When the mode becomes the automatic steering control mode and the switching command SW is output from the switching command section 131, the target steering angle θt is input from the target steering angle generating section 132 (step SP4), the actual steering angle θr is input from the steering angle sensor 14 (step SP5), the steering torque Tt is input from the torque sensor 154 (step SP6), the motor angular velocity ω is input from the motor angular velocity calculating section 144 (step SP7), and the motor electric current command value Imref is generated in the steering angle control section 200 (step SP10). Note that the order of inputting the target steering angle θt, the actual steering angle θr, the steering torque Tt, and the motor angular velocity ω can be changed arbitrarily.

After that, the switching section 142 performs switching based on the switching command SW from the switching command section 131 (step SP11) to have the electric current control/drive section 143 drive the motor 150 using the motor electric current command value Imref from the steering angle control section 200 (step SP12), and return to step SP3 mentioned above. The drive control (automatic steering control) by the motor electric current command value Imref is repeated until the switching command SW from the switching command section 131 is changed.

In the embodiment, the configuration is such that, when a steering operation by a driver intervenes during autonomous driving in a vehicle including the electric power steering apparatus 100 having the typical configuration as mentioned above, the intervention operation is fully reflected, and a feeling of strangeness and a feeling of discomfort given to the driver when the operation intervenes are reduced. Each component in the electric power steering apparatus 100 of the embodiment will be described below (see FIG. 5, and the like).

Figure 5:
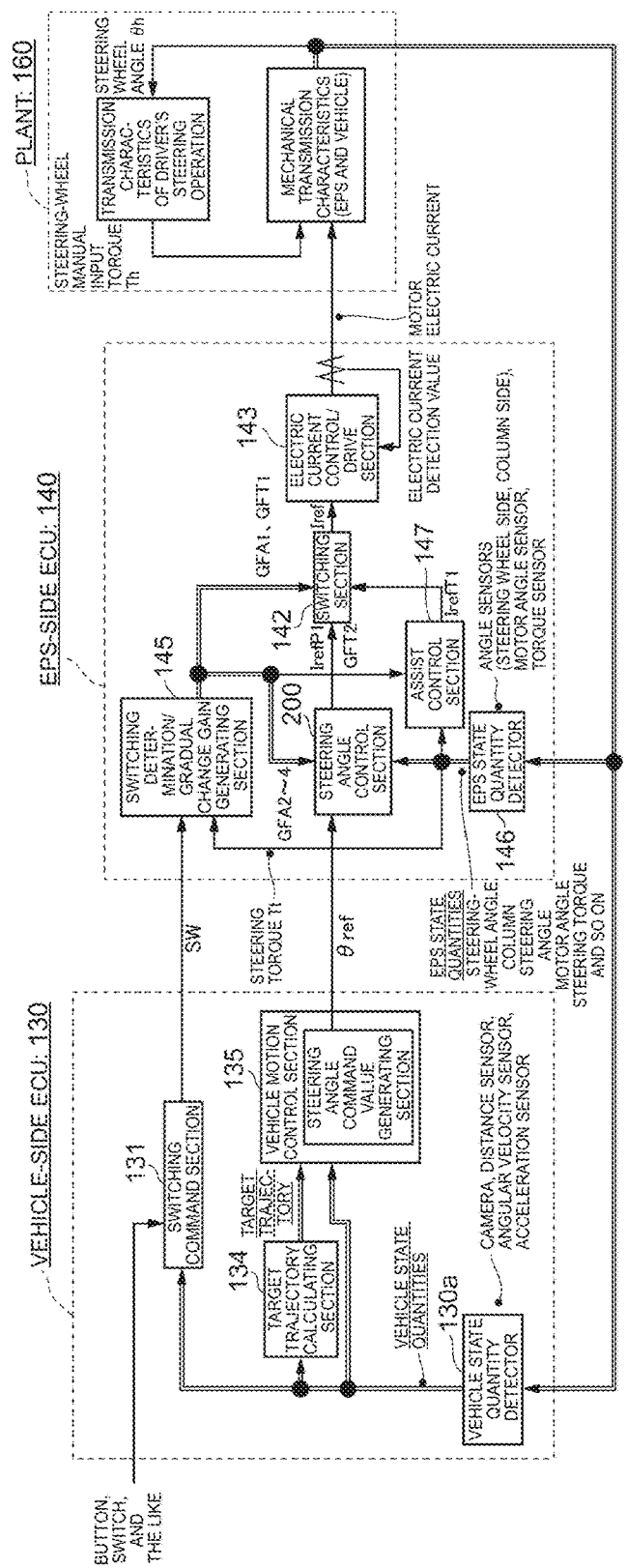
FIG. 5 is a block diagram illustrating a configuration example of the entire vehicle system.

The configurations of the vehicle-side ECU 130, the EPS-side ECU 140, and a plant 160 related to the electric power steering apparatus 100 of the embodiment are illustrated (see FIG. 5). Note that the double line in FIG. 5 means that plural signals are transmitted or received.

The vehicle-side ECU 130 includes a vehicle state quantity detector 130a, the switching command section 131, a target trajectory calculating section 134, and a vehicle motion control section 135.

The vehicle state quantity detector 130a detects vehicle state quantities based on data detected by a camera, a distance sensor, an angular velocity sensor, an acceleration sensor, and the like mounted in the vehicle, and transmits the vehicle state quantities to the switching command section 131, the target trajectory calculating section 134, and the vehicle motion control section 135.

The switching command section 131 outputs the switching command SW to the EPS-side ECU 140 (to a switching determination/gradual change gain generating section 145 thereof) based on the above-mentioned vehicle state quantities, and signals from buttons and switches.

The target trajectory calculating section 134 calculates target trajectory data based on the vehicle state quantities, and outputs the target trajectory data to the vehicle motion control section 135.

The vehicle motion control section 135 has a steering angle command value generating section 135a generate a steering angle command value θref based on the vehicle state quantities, and outputs the steering angle command value θref to the steering angle control section 200 of the EPS-side ECU 140.

The EPS-side ECU 140 includes the switching section 142, the electric current control/drive section 143, the switching determination/gradual change gain generating section 145, an EPS state quantity detector 146, an assist control section 147, and the steering angle control section 200 (see FIG. 5).

The EPS state quantity detector 146 detects EPS state quantities based on a steering-wheel angle θh output from the plant 160, and further various data detected by angle sensors (steering wheel side, column side), a motor angle sensor, a torque sensor, and the like mounted in the vehicle. The EPS state quantities (steering-wheel angle θh, column steering angle (steering angle on the lower side of the torsion bar), steering-wheel angle (steering angle on the upper side of the torsion bar), motor angle, steering torque, and so on) detected by the EPS state quantity detector 146 are output to the switching determination/gradual change gain generating section 145 and the assist control section 147, respectively. In the vehicle system illustrated in FIG. 5, the steering-wheel angle θh is detected in the EPS-side ECU 140, but the steering-wheel angle θh may be detected on the side of the vehicle-side ECU 130 instead.

The switching determination/gradual change gain generating section 145 makes a switching determination based on the switching command SW (between assist control and steering angle control) from the switching command section 131 of the vehicle-side ECU 130, and the steering torque Tt, and manages and outputs each gradual change gain to each function. The switching determination/gradual change gain generating section 145 in the embodiment outputs, to the steering angle control section 200, a speed control gradual change gain GFA2, a speed command gradual change gain GFA3, and a steering angle command gradual change gain GFA4, outputs, to the assist control section 147, an assist map gradual change gain GFT2, and outputs, to the switching section 142, a steering angle control output gradual change gain GFA1 and an assist control output gradual change gain GFT1.

The assist control section 147 outputs an electric current command value IrefT1 to the switching section 142 based on the steering torque Tt and the assist map gradual change gain GFT2 to apply an auxiliary steering force (assist) using the rotational force of the motor 20.

The steering angle control section 200 calculates a steering angle control electric current command value IrefP1 based on the steering angle command value θref, the speed control gradual change gain GFA2, the speed command gradual change gain GFA3, the steering angle command gradual change gain GFA4, and the EPS state quantities, and outputs the steering angle control electric current command value IrefP1 to the switching section 142. The switching section 142 switches between the steering angle control electric current command value IrefP1 from the steering angle control section 200 and the electric current command value IrefT1 from the assist control section 147 according to the steering angle control output gradual change gain GFA1 and the assist control output gradual change gain GFT1 from the switching determination/gradual change gain generating section 145. The electric current control/drive section 143 performs feedback control to make the electric current detection value follow the motor electric current command value Iref. Thus, the driving torque of the motor 150 can be controlled. The electric current control/drive section 143 may have a structure for a widely used motor control system.

The plant 160 has or offers mechanical transmission characteristics (related to EPS and vehicle) that follow a motor drive control signal (motor electric current) from the electric current control/drive section 143, and the driver's steering transmission characteristics that follow manual steering input by the driver (see FIG. 5). The term "plant" in this specification is a term that collectively calls control targets, such as the mechanical characteristics of the vehicle and the electric power steering apparatus 100, the driver's characteristics, and the like.

Then, the outline of the steering angle control section 200 in the EPS-side ECU 140 and respective components thereof will be described (see FIG. 6).

The actual steering angular velocity is calculated by performing an arithmetical operation typically used in an actual steering angular velocity calculating section, not illustrated. Specifically, the actual steering angular velocity may be calculated, for example, from a difference operation of the motor angle sensor and a gear ratio, or the actual steering angular velocity may be calculated from the difference operation of a steering-wheel angle or a column steering angle. An unillustrated LPF (low-pass filter) is inserted in the final stage of the operation system to reduce high-frequency noise.

In the embodiment, the steering-wheel angle (angle on the upper side of the torsion bar) is handled as the actual steering angle, but a configuration to handle the column steering angle as the actual steering angle can also be realized.

<Upper and Lower Limit Variable Limiter 202>

An upper and lower limit variable limiter (also called a steering angle command value upper and lower limit variable limiter) 202 is used to impose a limitation on the steering angle command value θref for autonomous driving or the like received from the vehicle-side ECU 130 in order to prevent an abnormal value or an excess value due to a communication error or the like from being input for steering angle control. With the switching operation between steering angle control and assist control, the upper and lower limiter values can be made variable to be appropriate values sequentially according to the steering angle command gradual change gain GFA4.

<Variable Rate Limiter 204>

A variable rate limiter 204 performs rate limit processing on the steering angle command value θref to avoid an abrupt change in steering angle control electric current command value as the steering angle control output due to an abrupt change in the steering angle command value θref. Such processing performed by the variable rate limiter 204 also leads to improving the safety of the driver from quick behavior of the steering wheel. In the variable rate limiter 204 of the embodiment, the rate limiter value is made variable to be an appropriate value sequentially according the steering angle command gradual change gain GFA4 along with the switching operation between steering angle control and assist control.

<Steering-Wheel Vibration Removing Means 206>

When the steering angle command is changing during autonomous driving, a frequency (around about 10 Hz) component is generated in the steering angle command value θref3 to excite vibration induced by the spring properties of the torsion bar and the inertia moment of the steering wheel. The vibrational frequency component can be reduced by the steering angle command value upper and lower limit variable limiter 202, the variable rate limiter 204, and a low-pass filter and a notch filter (these filters are used in steering-wheel vibration removing means 206) that reduce the steering-wheel vibrational frequency component included in the steering angle command value θref3 after being subjected to steering angle command gradual change, or by phase-lag compensation.

<Position Control Section 208>

A position control section 208 multiplies a deviation between the target steering angle θt and the actual steering angle θr by a proportional gain to calculate the steering angular velocity command value ωref. By this function, a steering angular velocity command value to make the actual steering angle (steering angle) θr approximate to the target steering angle θt can be generated. In the case of an FF filter 230 to be described later, the position control section 208 improves the performance to follow the target steering angle θt. Note that the term "position control" in this specification means the control of a steering angle position in the circumferential direction, i.e., it can also be expressed as "angle control of the steering-wheel angle."

<Speed Command Value Upper and Lower Limit Variable Limiter 210>

Processing by a speed command value upper and lower limit variable limiter 210 is performed on a steering angular velocity command value ωref1 after being multiplied by a gradual change gain to output the target steering angular velocity ωt. This speed command value upper and lower limit variable limiter 210 can change the limit values sequentially to appropriate values according to the speed command gradual change gain GFA3 to limit the steering angular velocity command value in such a manner that the upper and lower limiter values are made smaller when the gradual change gain GFA3 is less than a certain threshold value, and made larger when the gradual change gain GFA3 is equal to or larger than the threshold value.

<Steering Angular Velocity Control Section 212>

In the steering angle control section 200 of the embodiment, the target steering angular velocity ωt and the actual steering angular velocity ωr are input to a steering angular velocity control section 212 to calculate an electric current command value so as to make the actual steering angular velocity ωr follow the target steering angular velocity ωt.

<Steering Angle Control Output Upper and Lower Limit Limiter 214>

A steering angle control output upper and lower limit limiter 214 is used to impose a limitation on the electric current command value for steering angle control to prevent excessive output.

<Steering Intervention Compensating and Steering-Wheel Vibration Suppressing Means 220>

Steering intervention compensating and steering-wheel vibration suppressing means 220 functions as steering-wheel vibration suppressing means based on a torque signal detected by the torque sensor. According to this function, the steering wheel vibration suppressing effect during automatic steering is further improved compared with the case of using only the steering-wheel vibration removing means 206. The steering intervention compensating and steering-wheel vibration suppressing means 220 of the embodiment implements a steering-wheel vibration suppressing function using gain and phase compensation. For example, the phase compensation may be configured using a primary filter. Thus, the electric current command value is output in a direction to release a twist of the torsion bar. The steering intervention compensating and steering-wheel vibration suppressing means 220 works in a direction to reduce the twist angle, which also has the effect of reducing the feeling of strangeness to get caught upon steering intervention of manual input by the driver.

<FF Filter 230>

The FF (feedforward) filter 230 is an optional component configurable in the position control section 208 (see embodiments to be described later and illustrated in FIG. 7, and the like). According to the FF filter 230, the performance to follow the target steering angle θt is improved. The FF filter 230 has an effect, for example, as a primary phase-lead filter, but it may make any phase compensation other than that, or may use a pseudo-differential or an HPF (high-pass filter).

Here, various gradual change gains in the embodiment will be described below (see FIG. 5 and FIG. 6).

<Steering Angle Control Output Gradual Change Gain GFA1>

The electric current command value as output of the steering angle control output upper and lower limit limiter 214 is multiplied by the steering angle control output gradual change gain GFA1. The steering angle control output gradual change gain GFA1 is used for smooth switching operation between assist control and steering angle control to reduce the feeling of strangeness given to the driver, and realize the safety, and the like.

<Speed Control Gradual Change Gain GFA2>

The signal in the steering angular velocity control section 212 is multiplied by the speed control gradual change gain GFA2, and the speed control gradual change gain GFA2 is used to realize smooth switching. The speed control gradual change gain GFA2 is mainly used to relax the impact of the accumulation of integral values in steering angular velocity control upon switching.

<Speed Command Gradual Change Gain GFA3>

The speed command gradual change gain GFA3 is mainly used to realize smooth switching from assist control to steering angle control. The steering angular velocity command value ωref as position control output is multiplied by the speed command gradual change gain GFA3.

<Steering Angle Command Gradual Change Gain GFA4>

The steering angle command value from the variable rate limiter 204 is multiplied by the steering angle command gradual change gain GFA4.

<Assist Control Output Gradual Change Gain GFT1>

The electric current command value as output from the assist control section 147 is multiplied by the assist control output gradual change gain GFT1. The assist control output gradual change gain GFT1 is used for smooth switching operation between steering angle control and assist control and to realize driver's steering intervention during autonomous driving.

<Assist Map Gradual Change Gain GFT2>

Assist map output current in assist control (see a graph in FIG. 2 as an example of the assist map output current (where the ordinate is electric current command value and the abscissa is steering torque Tt)) is multiplied by the assist map gradual change gain GFT2. The assist map gradual change gain GFT2 is used for smooth switching operation between steering angle control and assist control and to realize driver's steering intervention during autonomous driving.

<Transition to Assist Control After Manual Input Determination>

Here, a transition to assist control after the manual input determination will be described (see FIG. 6B). Each gradual change gain after the detection of driver's manual input in an autonomous driving state (a state in which both steering angle control and assist control intervene) will be described below.

The gradual change gains GFA1 to 4 (the steering angle control output gradual change gain GFA1, the speed control gradual change gain GFA2, the speed command gradual change gain GFA3, and the steering angle command gradual change gain GFA4) sequentially decrease from 100% after the manual input determination, and linearly change to make a transition to 0% in the embodiment. In order to make the switching operation further smooth, the transition may be made along an S-shaped curve, or by setting a value for a linearly changing signal passing through an LPF (low-pass filter) as each gradual change gain (for example, primary LPF, cut-off frequency 2 [Hz]). Note that the gradual change gains GFA1 to 4 are not required to work with one another as the same transition, and these gradual change gains may make independent transitions as control factors.

(Steering Angle Command Gradual Change Gain GFA4)

The change rate set value of the variable rate limiter for the steering angle command value is set to 0. In other words, θref2 is set to a constant value. Though the illustration of this in a flowchart and the like is omitted, this can be realized by changing the change rate set value when the steering angle command gradual change gain GFA4 changes from the state of 100% to 0% side. In other words, θref2 is set to the constant value upon entering the switching state, and the constant value is multiplied by the steering angle command gradual change gain GFA4 to make θref3 and the target steering angle θt approximate to 0. Further, the target steering angle θt during switching is made approximate to 0 [deg] by multiplying θref2 by the steering angle command gradual change gain GFA4 to make steering angle control work in a neutral state. Further, the steering angle command gradual change gain GFA4 is multiplied before the steering-wheel vibration removing means 206 to remove the steering-wheel vibrational frequency component generated by the multiplication of the steering angle command gradual change gain GFA4.

(Assist Map Gradual Change Gain GFT2)

Figure 6A:
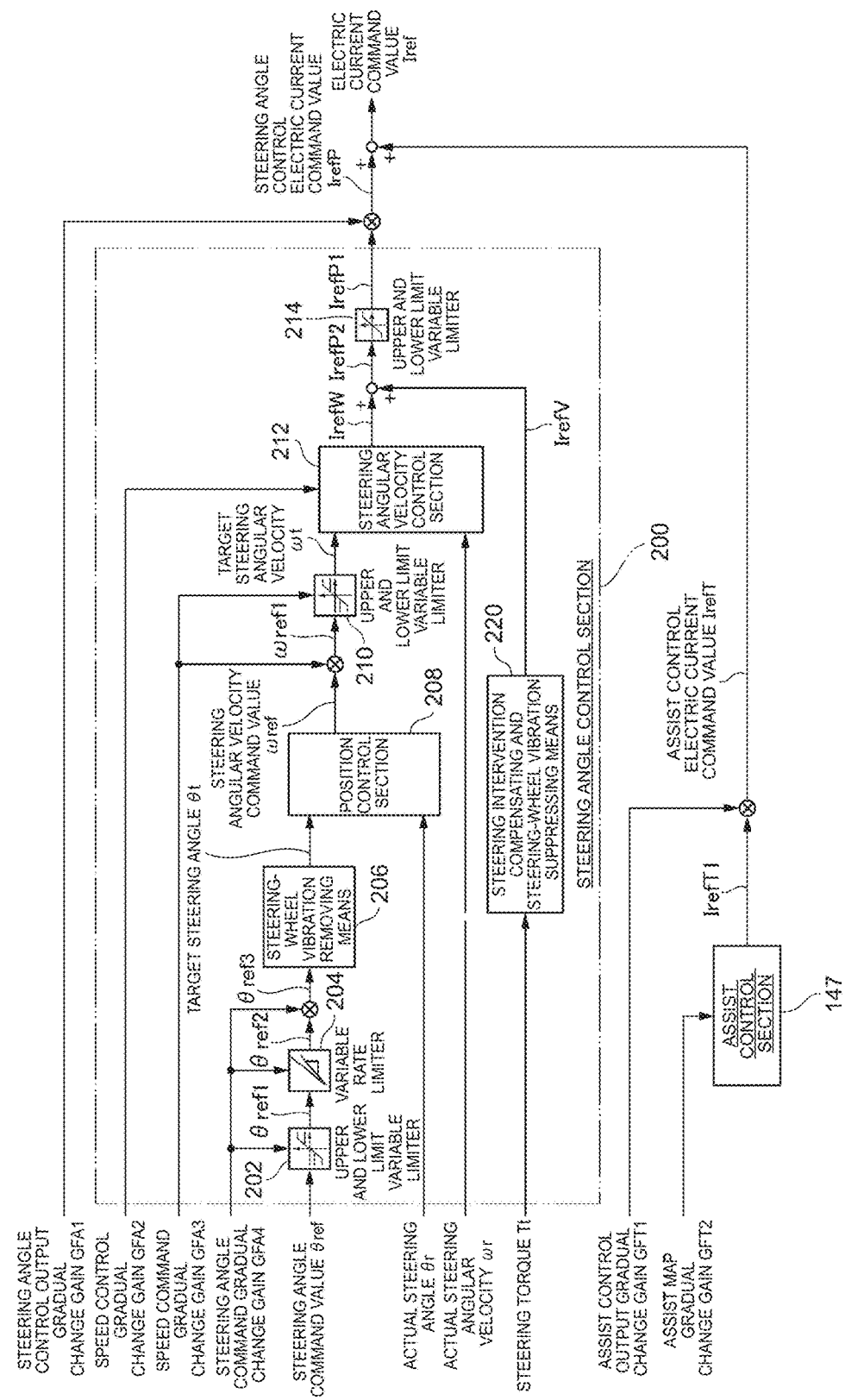
FIG. 6A is a block diagram illustrating an example of a steering angle control section in an EPS-side ECU.

In the autonomous driving state of the vehicle, this assist map gradual change gain GFT2 may be set over 100% (set to 300% in the example illustrated in FIG. 6B). This can reduce the sense of getting caught due to the interference of steering angle control and the feeling of strangeness at the time of a driver's operation intervention. In order to make the switching operation further smooth, the transitions of the assist control output gradual change gain GFT1 and the assist map gradual change gain GFT2 may be made along S-shaped curves, or by setting a value for a linearly changing signal passing through a LPF (low-pass filter) as each gradual change gain.

(Assist Control Output Gradual Change Gain GFT1)

In the autonomous driving state and the manual assist state, this assist control output gradual change gain GFT1 may be always set over 100%, or may be set as illustrated in FIG. 6B.

In the autonomous driving state, when the assist map gradual change gain GFT2 rises over 100%, the stability of the system may be affected to be instable and hence generate vibration. In order to ensure stability, the assist control output gradual change gain GFT1 can be set, for example, to 120% as a control factor to suppress the generation of vibration.

Figure 7:
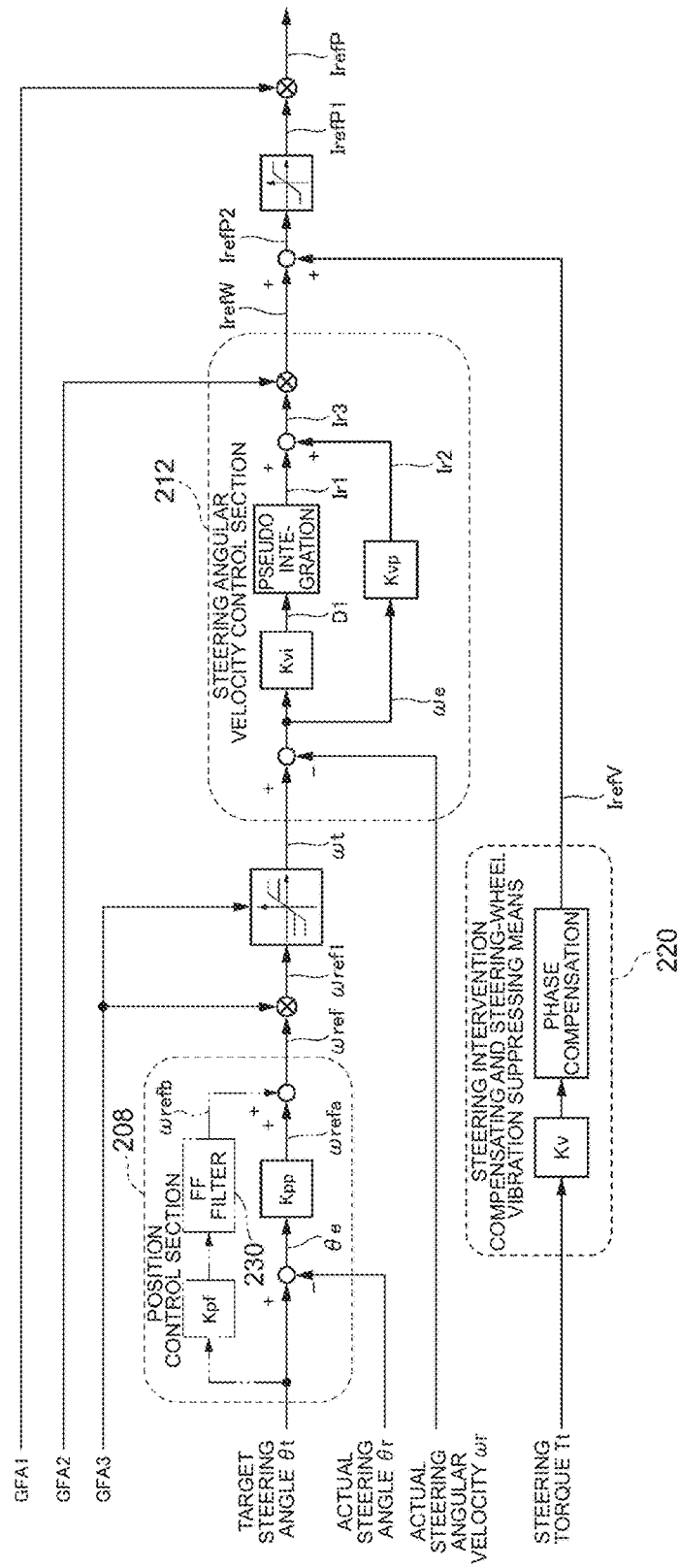
FIG. 7 is a block diagram of the steering angle control section to illustrate a first form of steering angle control.

Then, embodiments of steering angle control will be illustrated (see FIG. 7, and so on). Note that FIG. 7, and so on illustrate the target steering angle θt at the subsequent stage of the steering-wheel vibration removing means 206 (see FIG. 6) and the configuration of components that follow.

<First Form of Steering Angle Control>

The steering angular velocity control section 212 of the steering angle control section 200 illustrated in FIG. 7 performs PI control in steering angular velocity control, and performs a pseudo-integration in I control. More specifically, a deviation ωe between the target steering angular velocity ωt and the actual steering angular velocity ωr is multiplied by Kvi to set an operation amount D1 proportional to the magnitude of the deviation, and further I control using the pseudo-integration is performed (see FIG. 7). Reference sins in the drawings are as follows: Ir1 indicates a signal after the pseudo-integration, Ir2 indicates a signal after proportional gain Kvp, and Ir3 indicates a signal after addition, respectively (the same applies to the other embodiments). In the first form of steering angle control, the signal Ir3 after the addition is multiplied by the speed control gradual change gain GFA2, and output as a signal IrefW from the steering angular velocity control section 212. As described above, a signal in the steering angular velocity control section 212 is multiplied by the speed control gradual change gain GFA2, and used to realize smooth switching. Note that the pseudo-integration in the steering angular velocity control section 212 can be 1/(Ts+1)]×T using, for example, the first-order lag transfer function and gain.

<Second Form of Steering Angle Control>

Figure 8:
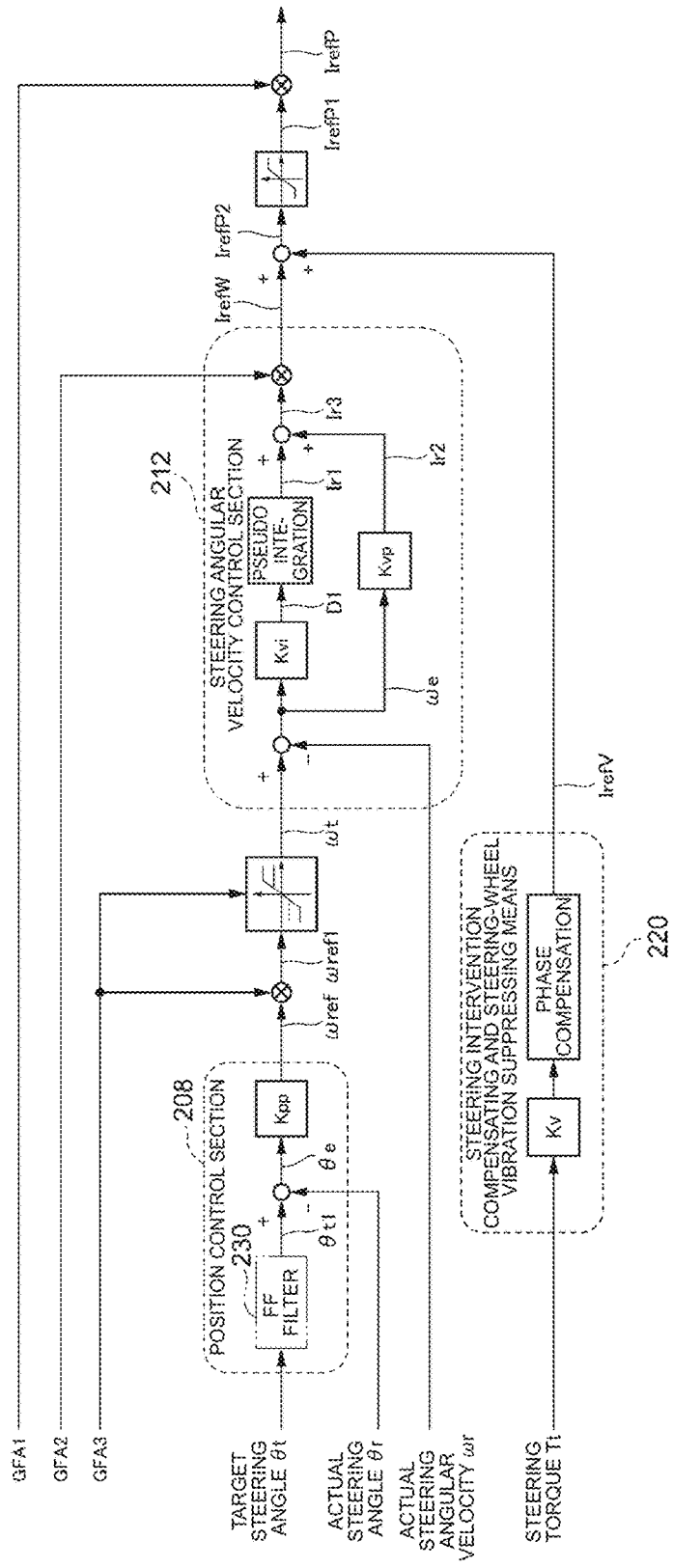
FIG. 8 is a block diagram of the steering angle control section to illustrate a second form of steering angle control.

The steering angular velocity control section 212 of the steering angle control section 200 illustrated in FIG. 8 performs PI control in steering angular velocity control, and performs a pseudo-integration in I control. More specifically, the deviation between the target steering angular velocity ωt and the actual steering angular velocity ωr is multiplied by Kvi to set the operation amount D1 proportional to the magnitude of the deviation, and further I control using the pseudo-integration is performed (see FIG. 8). Like in the first form described above, in the second form of steering angle control, the signal Ir3 after the addition is multiplied by the speed control gradual change gain GFA2, and output from the steering angular velocity control section 212 as the signal IrefW.

<Third Form of Steering Angle Control>

Figure 9:
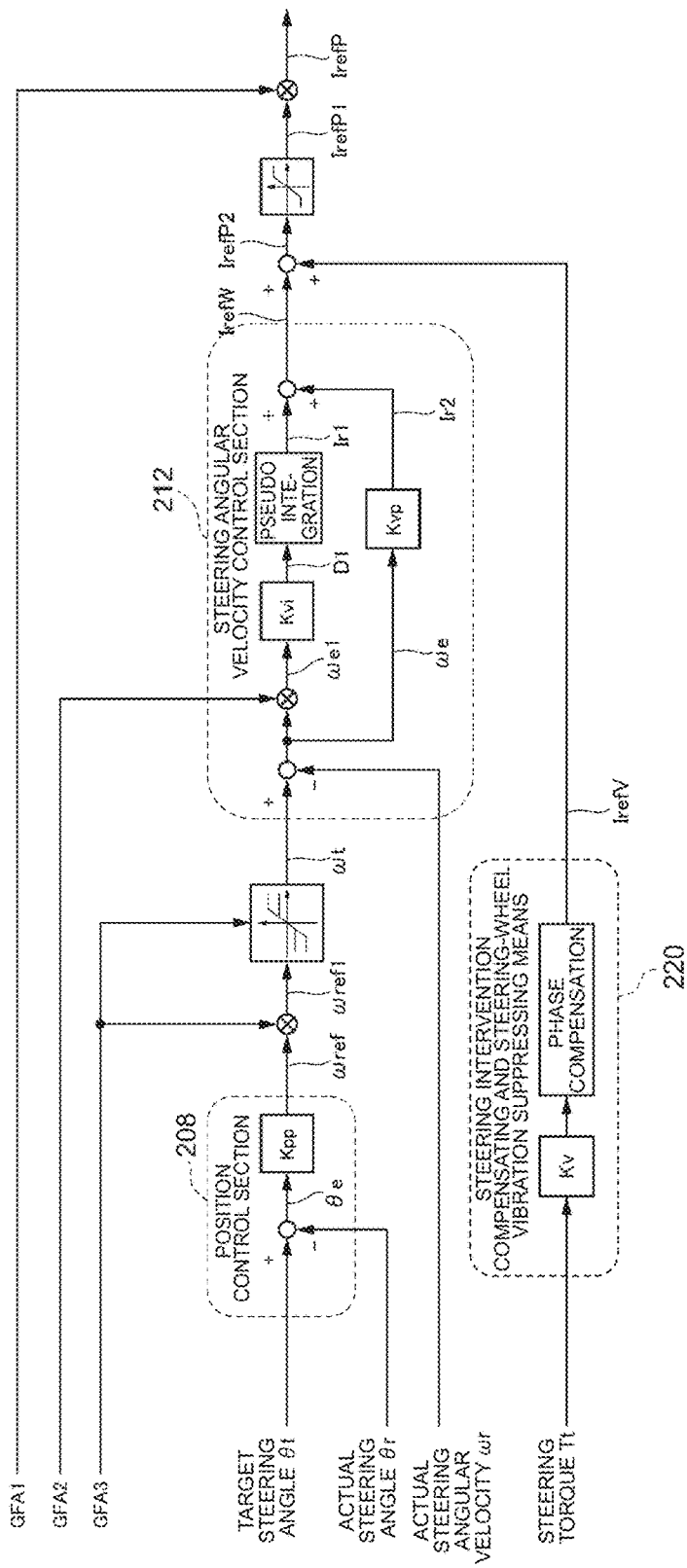
FIG. 9 is a block diagram of the steering angle control section to illustrate a third form of steering angle control.

The steering angular velocity control section 212 of the steering angle control section 200 illustrated in FIG. 9 performs PI control in steering angular velocity control, and performs a pseudo-integration in I control. In the third form of steering angle control, the deviation between the target steering angular velocity ωt and the actual steering angular velocity ωr is multiplied by the speed control gradual change gain GFA2 to generate a signal ωe1, and this signal ωe1 is multiplied by Kvi to set the operation amount D1 proportional to the magnitude of the deviation. Further, I control using the pseudo-integration is performed (see FIG. 9).

<Fourth Form of Steering Angle Control>

Figure 10:
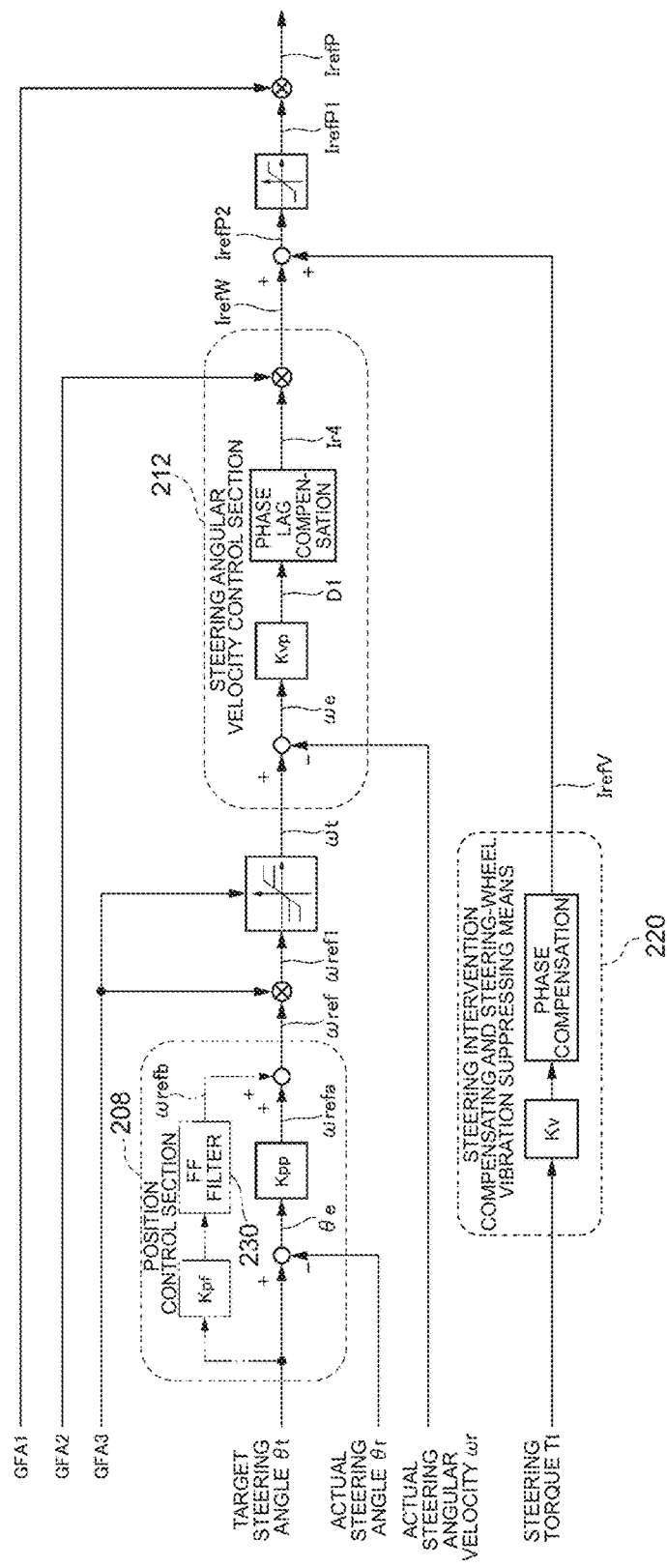
FIG. 10 is a block diagram of the steering angle control section to illustrate a fourth form of steering angle control.

The steering angular velocity control section 212 of the steering angle control section 200 illustrated in FIG. 10 performs phase-lag compensation. In the fourth form of steering angle control to multiply the deviation between the target steering angular velocity ωt and the actual steering angular velocity ωr by Kvp to set the operation amount D1 proportional to the magnitude of the deviation. Further, a signal Ir4 after the phase-lag compensation is multiplied by the speed control gradual change gain GFA2, and output from the steering angular velocity control section 212 as the signal IrefW (see FIG. 10).

<Fifth Form of Steering Angle Control>

Figure 11:
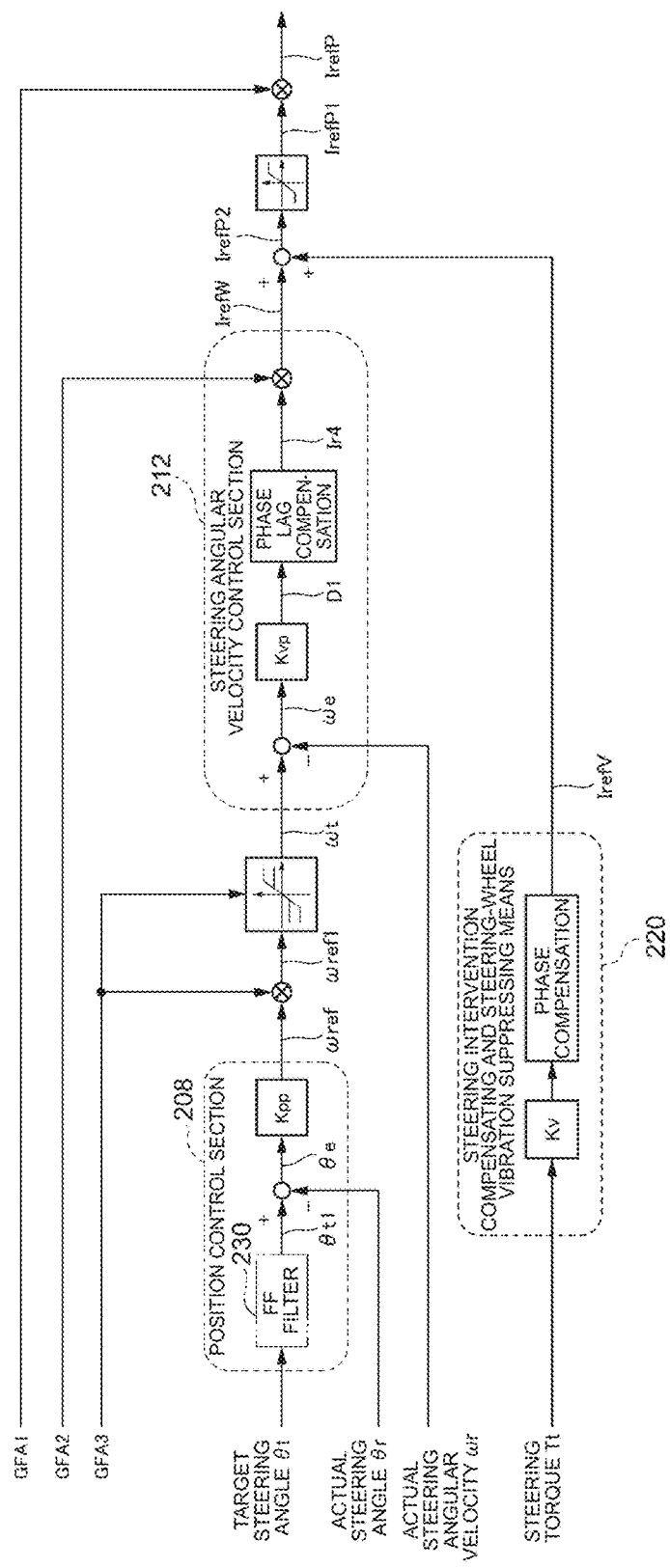
FIG. 11 is a block diagram of the steering angle control section to illustrate a fifth form of steering angle control.

The steering angular velocity control section 212 of the steering angle control section 200 illustrated in FIG. 11 performs phase-lag compensation. Like in the fourth form described above, in the fifth form of steering angle control, the deviation between the target steering angular velocity ωt and the actual steering angular velocity ωr is multiplied by Kvp to set the operation amount D1 proportional to the magnitude of the deviation. Further, the signal Ir4 after the phase-lag compensation is multiplied by the speed control gradual change gain GFA2, and output from the steering angular velocity control section 212 as the signal IrefW (see FIG. 11). PI control using the pseudo-integration is equivalently replaced with phase-lag compensation and gain.

<Sixth Form of Steering Angle Control>

Figure 12:
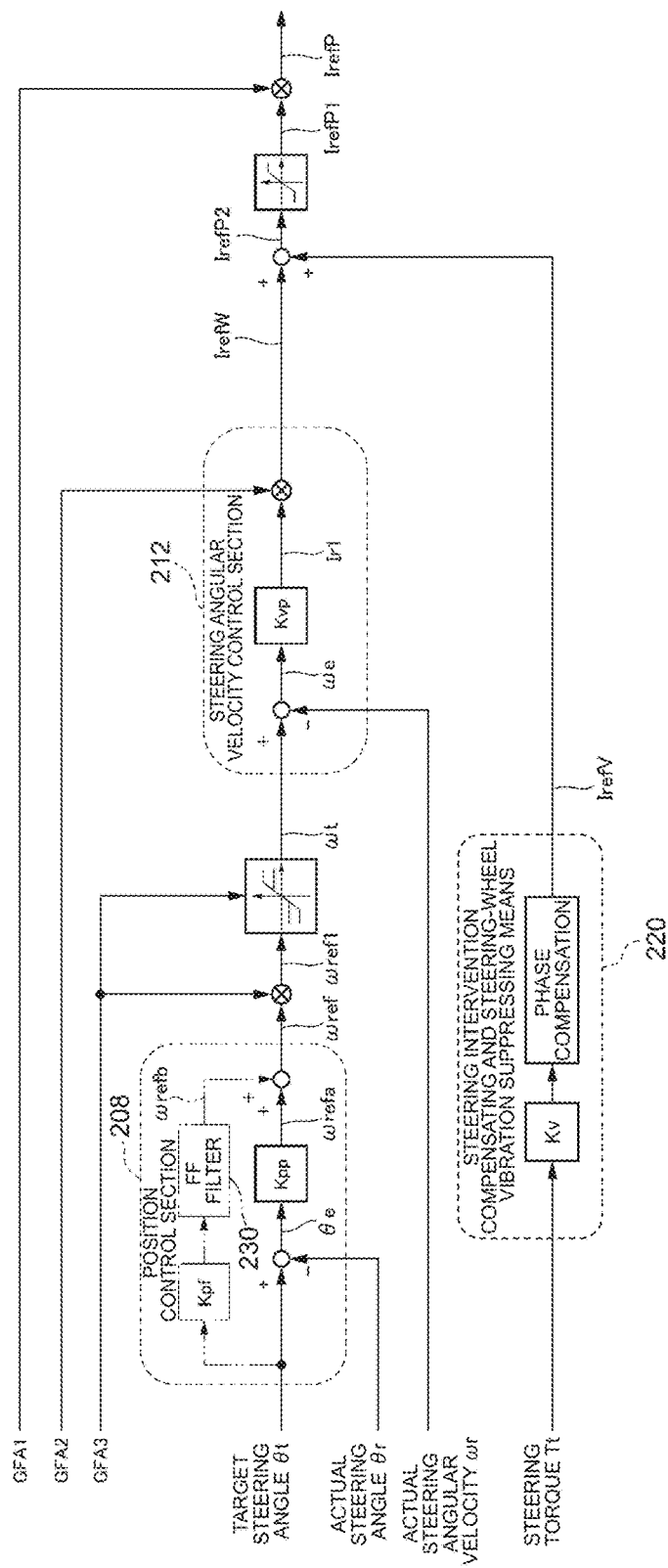
FIG. 12 is a block diagram of the steering angle control section to illustrate a sixth form of steering angle control.
Figure 13A:
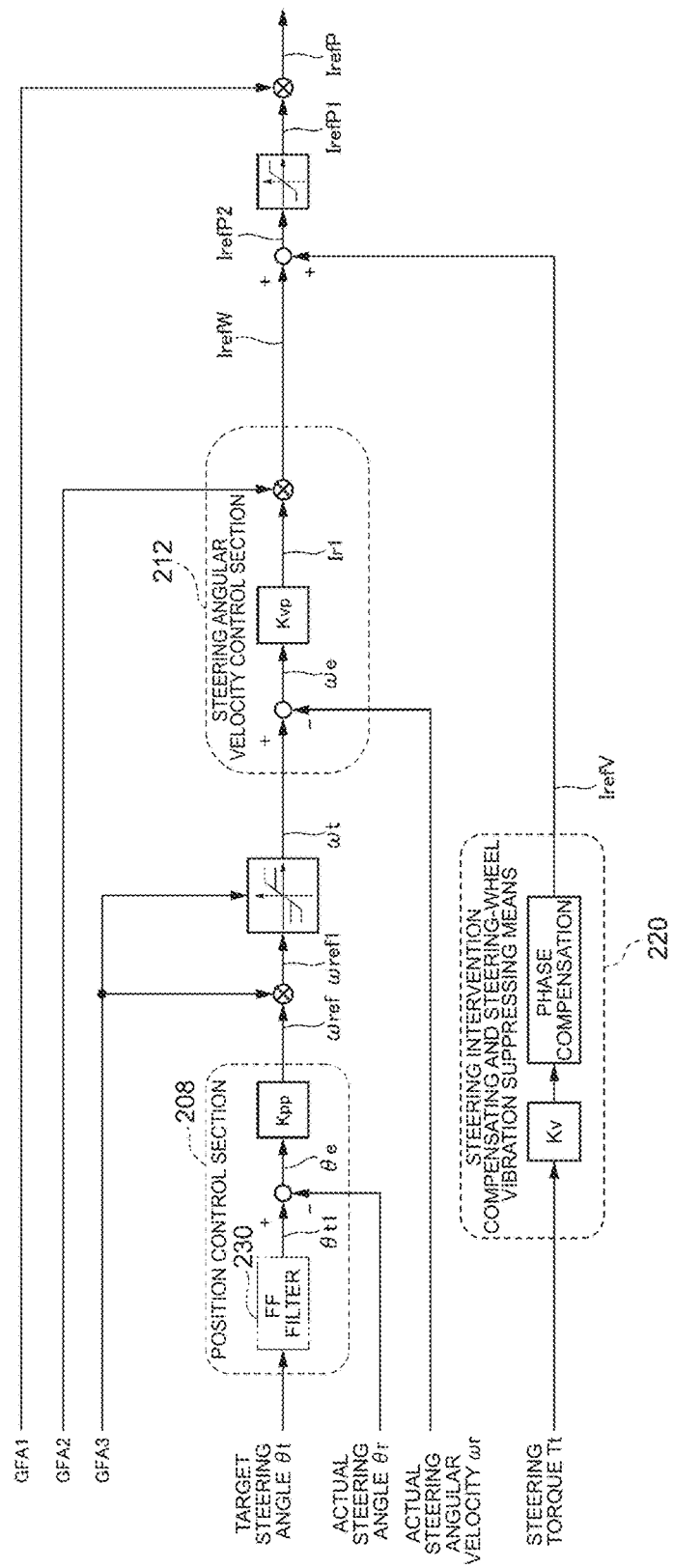
FIG. 13A is a block diagram of the steering angle control section to illustrate another example of the sixth form of steering angle control.

The steering angular velocity control section 212 of the steering angle control section 200 illustrated in FIG. 12 and FIG. 13A performs proportional control (P control). In the sixth form of steering angle control, the deviation between the target steering angular velocity ωt and the actual steering angular velocity ωr is multiplied by Kvp, and a signal Ir1 indicating an operation amount proportional to the magnitude of the deviation is multiplied by the speed control gradual change gain GFA2 and output from the steering angular velocity control section 212 as the signal IrefW (see FIG. 12 and FIG. 13A).

<Seventh Form of Steering Angle Control>

Figure 13B:
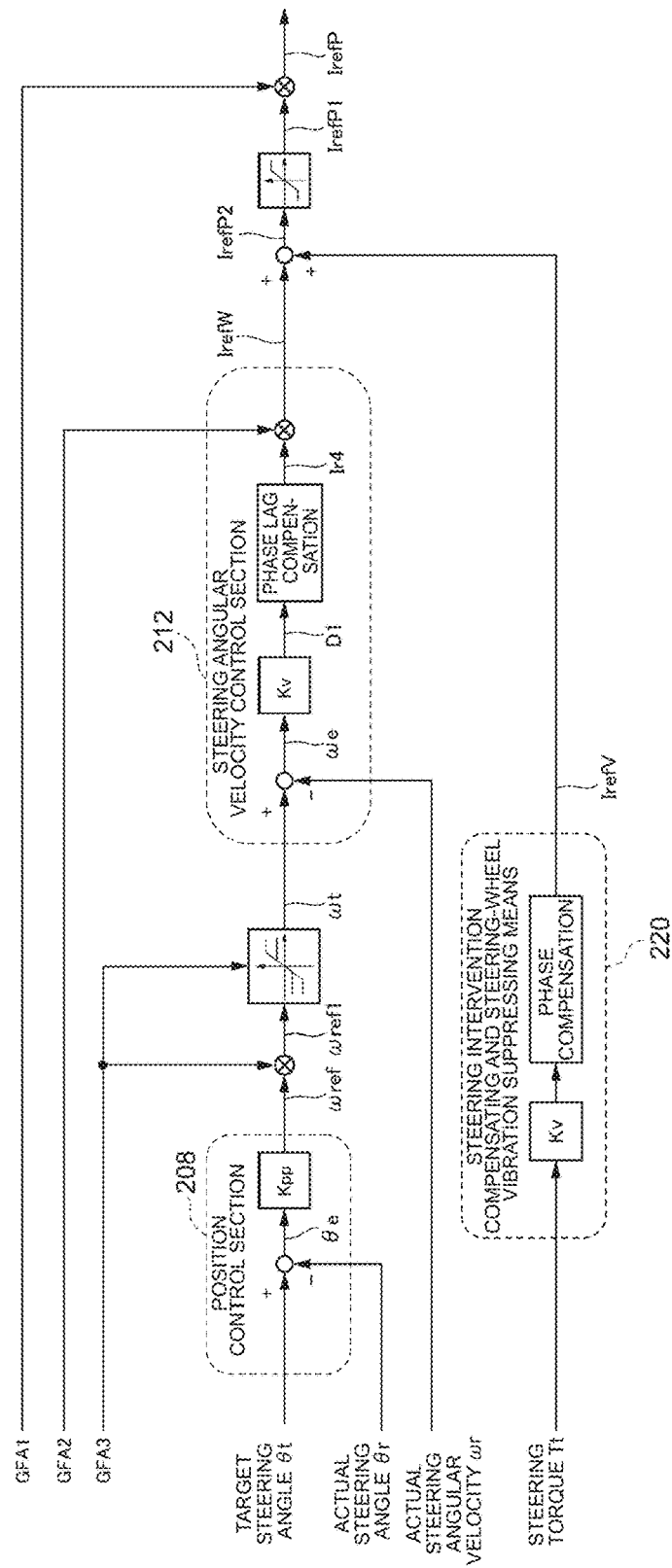
FIG. 13B is a block diagram of the steering angle control section to illustrate a seventh form of steering angle control.

The steering angular velocity control section 212 of the steering angle control section 200 illustrated in FIG. 13B calculates an electric current command value by control using a proportional gain and phase-lag compensation. More specifically, the deviation ωe between the target steering angular velocity ωt and the actual steering angular velocity ωr is multiplied by gain Kv to set the operation amount D1 proportional to the magnitude of the deviation. Further, the signal Ir4 after the phase-lag compensation is multiplied by the speed control gradual change gain GFA2 to calculate the electric current command value IrefW.

<Eighth Form of Steering Angle Control>

Figure 13C:
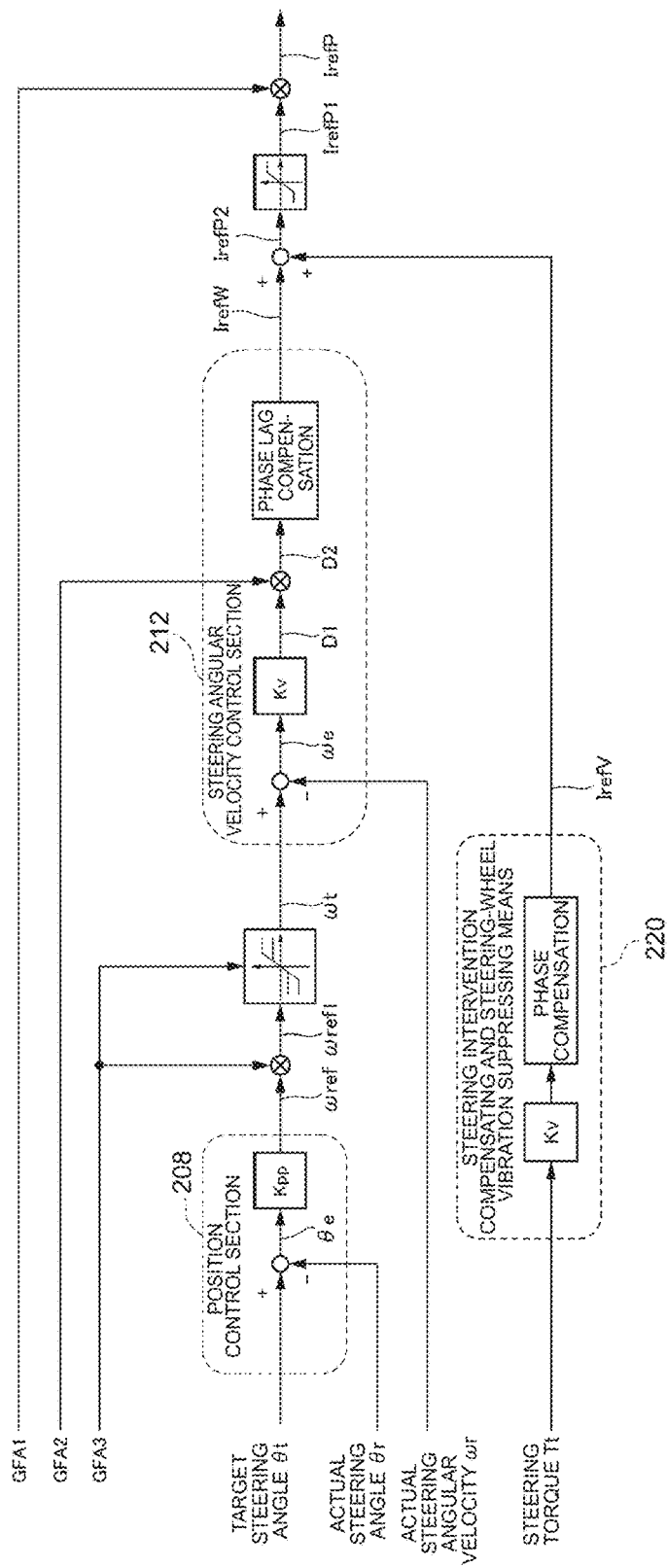
FIG. 13C is a block diagram of the steering angle control section to illustrate an eighth form of steering angle control.

The steering angular velocity control section 212 of the steering angle control section 200 illustrated in FIG. 13C calculates an electric current command value by control using the proportional gain and phase-lag compensation. More specifically, the deviation ωe between the target steering angular velocity ωt and the actual steering angular velocity ωr is multiplied by gain Kv to set the operation amount D1 proportional to the magnitude of the deviation, and an operation amount D2 is calculated from the operation amount D1 and the speed control gradual change gain GFA2 and subjected to phase-lag compensation to calculate the electric current command value IrefW.

According to each of the first to eighth forms of steering angle control described above, steering intervention without a feeling of strangeness such as a sense of getting caught can be realized even when there are no "manual input detection" and "switching operation" during autonomous driving of the vehicle. The results and the like as the evidence will be described below as Example 1 (see FIG. 14A to FIG. 20).

Example 1

Evidence for Solution to Problem 1 and Problem 2

From a simulation in consideration of a driver's steering model, time responses of an actual steering angle (also called a steering-wheel angle below and denoted by sign θh. See the thin line) and a steering torque Tt (see the dashed line) with respect to a driver's target angle θarm (see the thick line in the figures) during autonomous driving (where the steering angle command value θref is fixed at 0 [deg]) are illustrated as an example in FIG. 14A, and the like.

Here, a plant model used in the simulation will be described (see FIG. 26 and FIG. 27).

Figure 26:
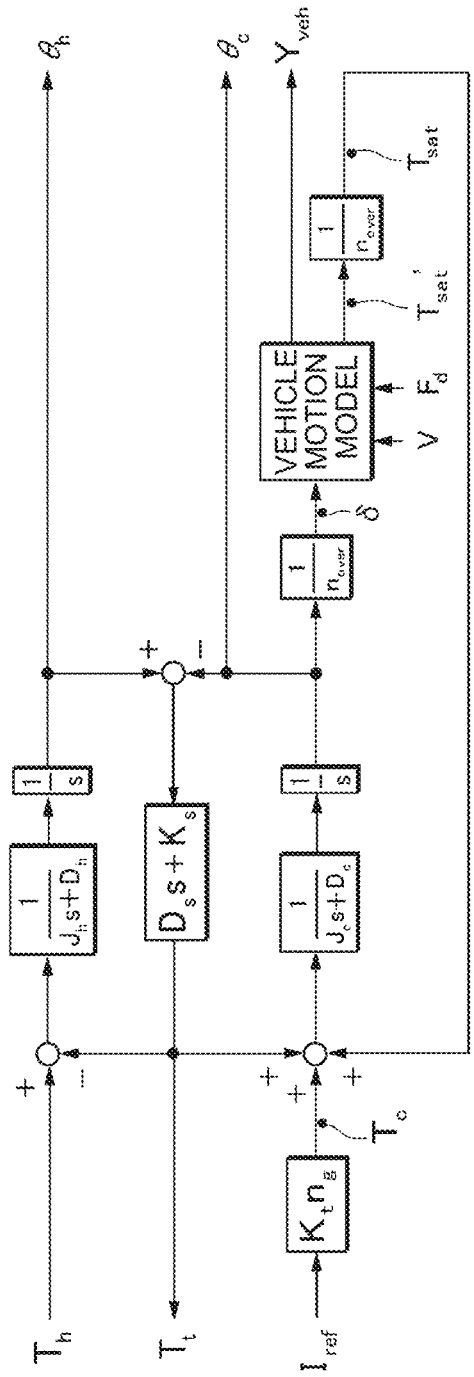
FIG. 26 is a diagram illustrating a plant model used in a simulation in consideration of a driver's steering model.

A plant model (mechanical model) used in the simulation is illustrated in FIG. 26. In this plant model, assuming that the follow-up performance of the motor electric current value with respect to the electric current command value is sufficiently quick, the detailed description of the electric current control section is omitted, and electric current command value=motor electric current is set and handled as a signal name Iref. The vehicle speed V is kept constant. The column inertia moment Jc is a sum total of the motor inertia moment and the inertia moments of the shaft, the rack & pinion, and tires converted to that of the column shaft. A motor angle θm and a column angle θc have a relation of the worm reduction gear ratio. The column angle θc and a tire turning angle δ have a relation of the ratio of overall ratio Nover. The torsion bar torque and the steering torque are the same signal, which is denoted by Tt. Here, the column to the tires are modeled as one column inertia.

Jc: column inertia [kgm^2]
Dc: column damping coefficient [Nm/(rad/s)]
Jh: steering wheel inertia [kgm^2]
Dh: steering-wheel damping coefficient [Nm/(rad/s)]
Ks: torsion bar spring constant [Nm/rad]
Ds: torsion bar damping constant [Nm/(rad/s)]
Kt: motor torque constant [Nm/A]
reduction gear ratio: ng
Tc: motor generated torque converted to that of column shaft [Nm] Note that the motor generated torque is converted to the torque of the column shaft (in consideration of that of a reducer). Further, since the actual motor electric current is handled as being identical to the electric current command value Iref, electric current control is omitted.
Th: steering-wheel manual input torque [Nm]
Tt: torsion bar torque [Nm]
Iref: electric current command value [A]
θh: steering-wheel angle [rad]
θc: column steering angle [rad]
V: vehicle speed [m/s]
Yveh: lateral moving distance at gravity center of vehicle [m]
δ: tire turning angle [rad]
Fd: lateral external force acting on gravity center of vehicle [N]
Tsat: Tsat' converted to that of column shaft [Nm]
Tsat': moment acting around kingpin due to road surface reaction force [Nm]

A vehicle motion model will be described. Differential equations of the vehicle are as in mathematical expression 1 and mathematical expression 2.

$$mV\frac{d}{dt}\beta(t) + 2(K_f + K_r)\beta(t) + \left\{mV + \frac{2(l_fK_f - l_rK_r)}{V}\right\}\gamma(t) = 2K_f\delta(t) + F_d(t) \quad [\text{Math. 1}]$$

$$2(l_fK_f - l_rK_r)\beta(t) + I\frac{d}{dt}\gamma(t) + \frac{2(l_f^2K_f - l_r^2K_r)}{V}\gamma(t) = 2l_fK_f\delta(t) - l_dF_d(t) \quad [\text{Math. 2}]$$

A sideslip angle β and a yaw rate γ after Laplace transform are expressed by mathematical expression 3.

$$\begin{bmatrix}\beta(s)\\\gamma(s)\end{bmatrix} = \begin{bmatrix} mVs + 2(K_f + K_r) & mV + \frac{2(l_fK_f - l_rK_r)}{V} \\ 2(l_fK_f - l_rK_r) & Is + \frac{2(l_f^2K_f - l_r^2K_r)}{V} \end{bmatrix} \begin{bmatrix}2K_f\delta(s) + F_d(s)\\2l_fK_f\delta(s) - l_dF_d(s)\end{bmatrix} \quad [\text{Math. 3}]$$

The moment received by each tire from the road surface and acting around the kingpin is expressed by mathematical expression 4.

$$T'_{sat} = 2\xi K_f\left(\beta + \frac{l_f}{V}\gamma - \delta\right) \quad [\text{Math. 4}]$$

Lateral acceleration at the gravity center of the vehicle under an approximation condition is expressed by mathematical expression 5.

$$a_y = V(s\beta + \gamma) \quad [\text{Math. 5}]$$

Lateral moving distance at the gravity center of the vehicle is expressed by mathematical expression 6.

$$Y_{veh} = \frac{a_y}{s^2} \quad [\text{Math. 6}]$$

Note that the vehicle motion model may be any model as long as the transmission characteristics from the tire turning angle δ to the moment Tsat' acting around the kingpin due to the road surface reaction force are considered. Note that the vehicle model and the steering model used in the simulation are not limited to those mentioned above, and general literatures and the like may be referred to. Further, mathematical expression 1, mathematical expression 2, mathematical expression 4, and mathematical expression 5 as relational expressions of the vehicle model are cited, for example, in *Vehicle Motion and Control* (by Masato Abe) published by Tokyo Denki University Press. The steering model is, for example, mentioned in "Study on Evaluation of Feeling of Car Steering in Consideration of Arm Musculoskeletal Characteristics" (by Daisuke Yokoi), master's thesis of Mie university.

Figure 27:
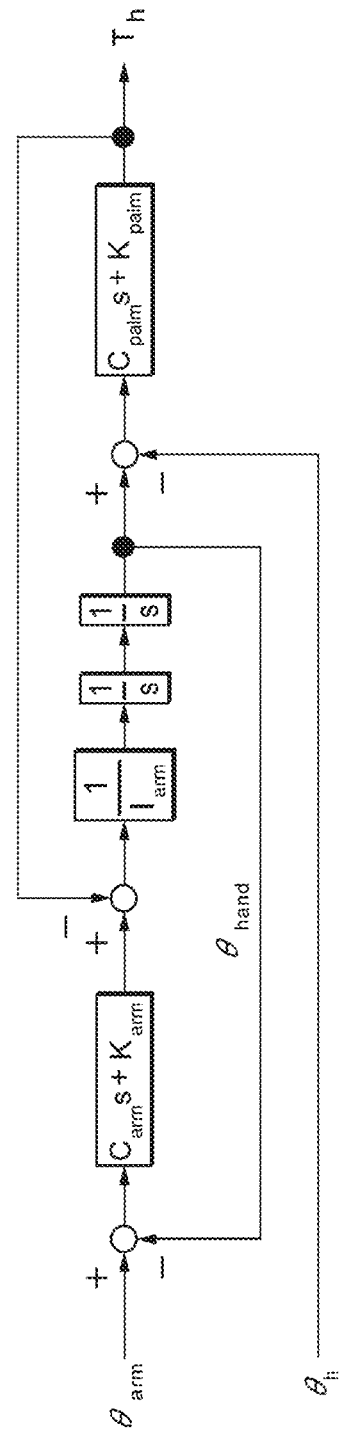
FIG. 27 is a diagram illustrating an example of the driver's steering model.

An example of the driver's steering model is illustrated in FIG. 27. In simulating steering by a driver, the steering model illustrated in FIG. 27 is used, where the steering-wheel angle θh output from the mechanical model (see FIG. 26) is input to the steering model, and the manual input torque Th output from the steering model is output to the mechanical model. Here, the target angle (driver's steering target angle) is denoted by θarm.

The conditions as an example are "pseudo-integration: assist control output gradual change gain GFT1=one times and assist map gradual change gain GFT2=three times," and "where the steering angle control output gradual change gain GFA1, the speed control gradual change gain GFA2, the speed command gradual change gain GFA3, and the steering angle command gradual change gain GFA4 are one times" as will be described later.

Figure 14A:
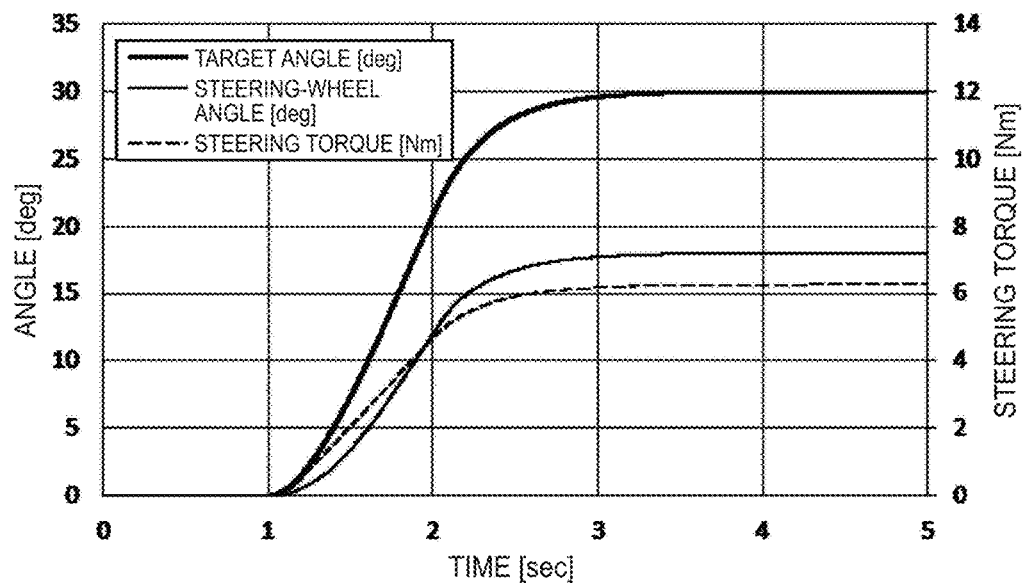
FIG. 14A is a graph in the case of a pseudo-integration to illustrate the evidence to realize steering intervention without a feeling of strangeness and represent changes in angle (target angle, steering-wheel angle) and steering torque over time.

The steering-wheel angle θh and the steering torque Tt (=torsion bar torque) are compared under respective conditions when the driver's target angle θarm illustrated in FIG. 14A is input (see FIG. 14A to FIG. 16).

Thick line . . . Pseudo-integration (P control in FIG. 16): assist control output gradual change gain GFT1=one times and assist map gradual change gain GFT2=one times Thin line . . . Pseudo-integration (P control in FIG. 16): assist control output gradual change gain GFT1=one times and assist map gradual change gain GFT2=three times Dashed line . . . Pure integration (PI control in FIG. 16): assist control output gradual change gain GFT1=one times and assist map gradual change gain GFT2=one times where the steering angle control output gradual change gain GFA1, the speed control gradual change gain GFA2, the speed command gradual change gain GFA3, and the steering angle command gradual change gain GFA4 are one times.

Figure 16:
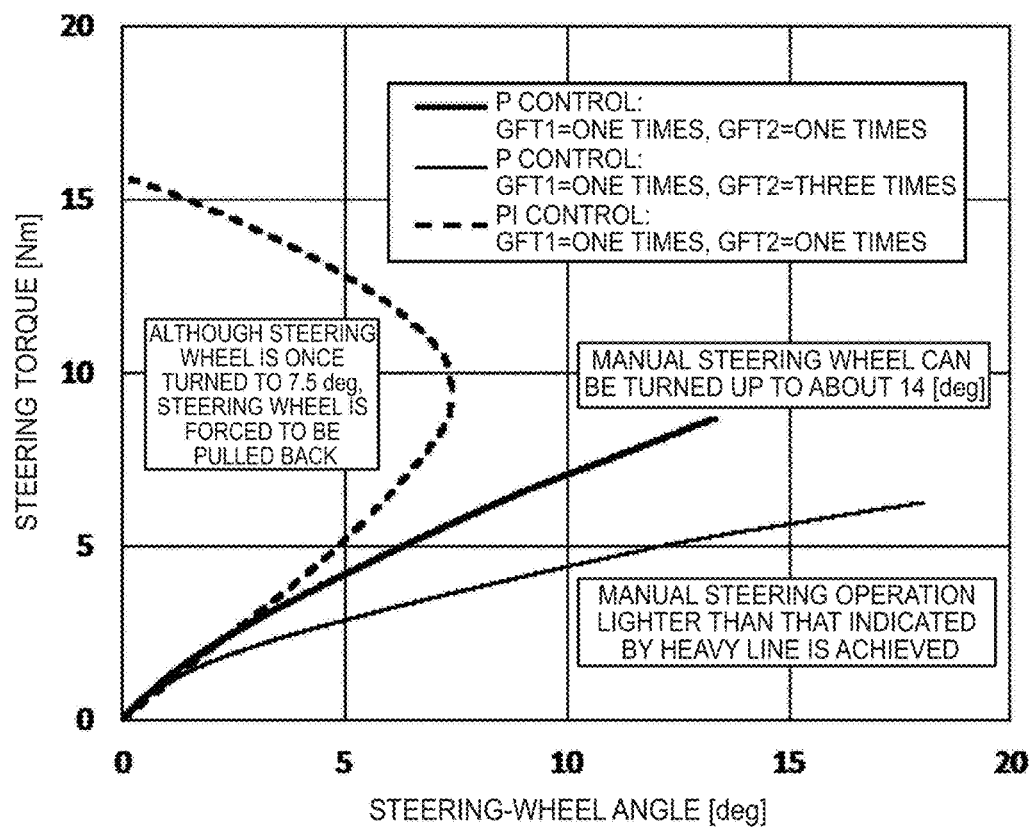
FIG. 16 is a graph representing relations between steering-wheel angle and steering torque due to differences in steering angular velocity control in Example 1 (when P control is performed in the steering angular velocity control section).

From the thick line and the dashed line, it is found that the vehicle can be steered well when performing PI control for speed control using "pseudo-integration" (when performing P control in the case of FIG. 16). The reasons can be as follows.

In other words, the dashed line indicates that, although the steering-wheel angle θh is steered to 7.5 [deg], the velocity deviation (deviation between the steering angular velocity command value and the actual steering angular velocity) continues to be accumulated due to the pure integration of speed control PI to force the steering angle command value to return eventually to the steering angle command value θref (=0 [deg]). This further leads to generating a very large torque, and hence makes it difficult for the driver to steer (a steering torque over 15 [Nm] is generated at 0 [deg]). In the conventional techniques, although the assist control command value is 0 [deg] during steering angle control before switching, since this makes it more difficult for the driver to steer than that in the case of the dashed line, the description thereof is omitted. Further, in comparison with the electric power steering apparatus according to the embodiment, GFT1=one times and GFT2=one times are set to see a difference in integration method.

In contrast, the thick line indicates that the steering wheel can be turned up to about 14 [deg], and is not made to return to the steering angle command value 0 [deg]. This results from the fact that the use of the pseudo-integration (P control in FIG. 16) limits the accumulation of the velocity deviation (no accumulation of the velocity deviation using the integration in FIG. 16). Further, in the thin line (assist map gradual change gain GFT2=three times), it can be confirmed that lighter steering than that in the thick line can be realized.

It is found that an increase in assist map gradual change gain GFT2 can lead to achieving the driver's steering intervention with light steering.

Figure 14B:
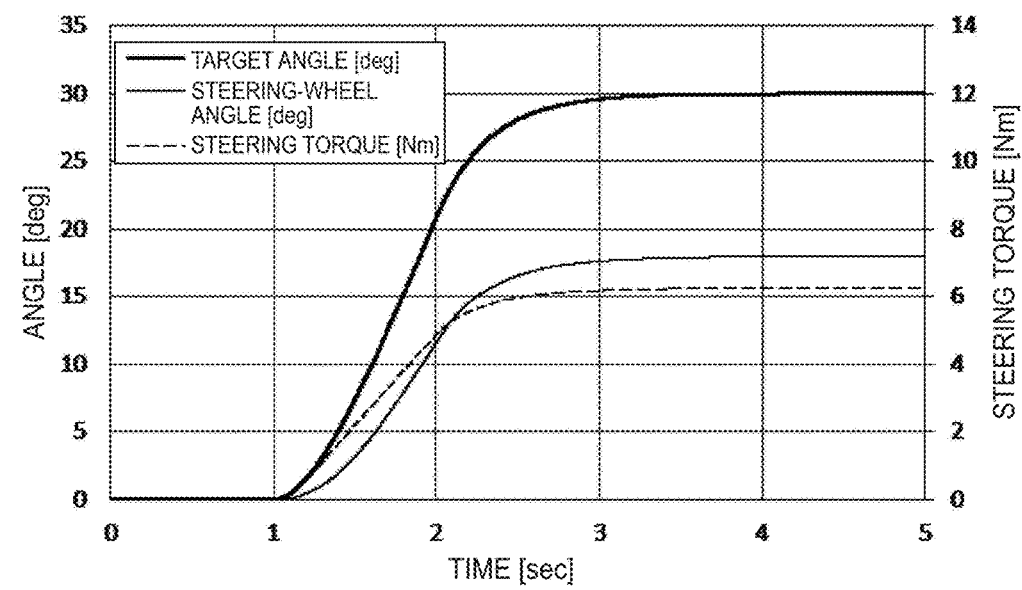
FIG. 14B is a graph in the case of P control to illustrate the evidence to realize steering intervention without a feeling of strangeness and represent changes in angle (target angle, steering-wheel angle) and steering torque over time.
Figure 15:
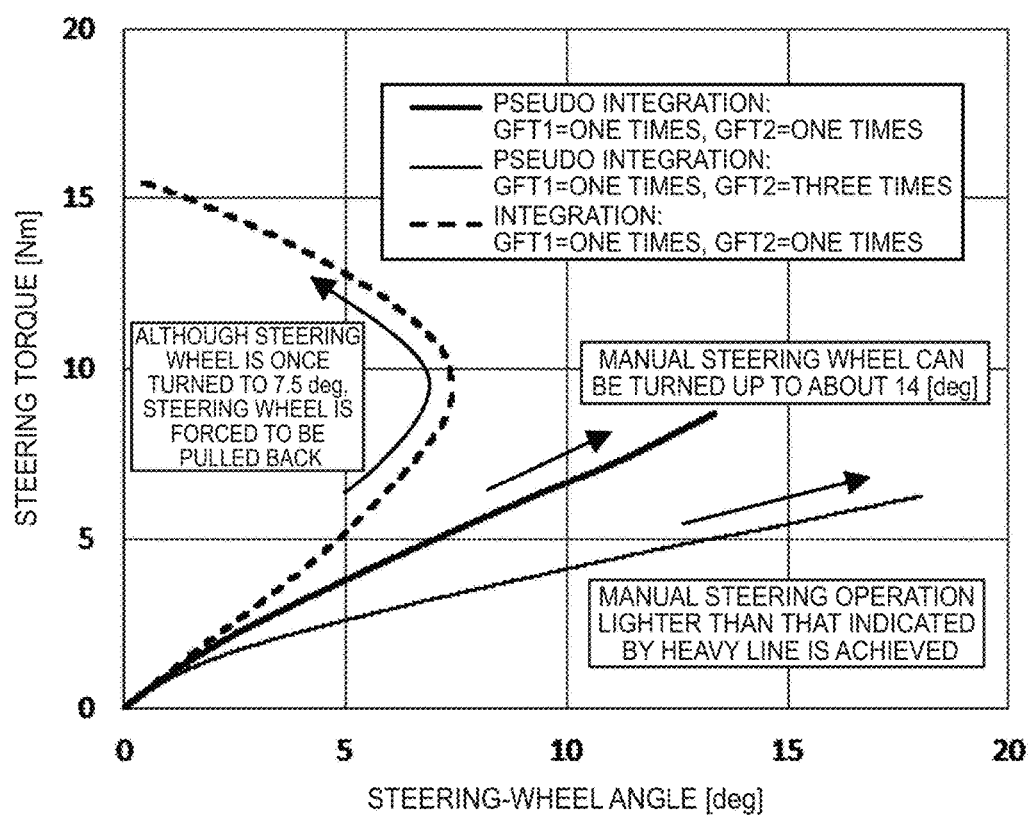
FIG. 15 is a graph representing relations between steering-wheel angle and steering torque due to differences in integration method for steering angular velocity control in Example 1 (when a pseudo-integration is performed in a steering angular velocity control section).

Further, the steering-wheel angle θh and the steering torque Tt (=torsion bar torque) are compared under respective conditions when the driver's target angle θarm illustrated in FIG. 14B is input (see FIG. 14B to FIG. 16).

Thick line . . . P control: assist control output gradual change gain GFT1=one times and assist map gradual change gain GFT2=one times Thin line . . . P control: assist control output gradual change gain GFT1=one times and assist map gradual change gain GFT2=three times Dashed line . . . PI control: assist control output gradual change gain GFT1=one times and assist map gradual change gain GFT2=one times where the steering angle control output gradual change gain GFA1, the speed control gradual change gain GFA2, the speed command gradual change gain GFA3, and the steering angle command gradual change gain GFA4 are one times.

From the thick line and the dashed line, it is found that the vehicle can be steered well when performing P control for speed control (see FIG. 14B and FIG. 16). The reasons can be as follows.

In other words, the dashed line indicates that, although the steering-wheel angle θh is steered to 7.5 [deg], the velocity deviation (deviation between the steering angular velocity command value and the actual steering angular velocity) continues to be accumulated due to the pure integration of speed control PI to force the steering angle command value to return eventually to the steering angle command value θref (=0 [deg]). This further leads to generating a very large torque, and hence makes it difficult for the driver to steer (a steering torque over 15 [Nm] is generated at 0 [deg]). In the conventional techniques, although the assist control command value is 0 [deg] during steering angle control before switching, since this makes it more difficult for the driver to steer than that in the case of the dashed line, the description thereof is omitted. Further, in comparison with the electric power steering apparatus according to the embodiment, GFT1=one times and GFT2=one times are set to see a difference in integration method.

In contrast, the thick line indicates that the steering wheel can be turned up to about 14 [deg], and is not made to return to the steering angle command value 0 [deg]. This results from the fact that there is no accumulation of the velocity deviation by using the proportional control. Further, in the thin line (assist map gradual change gain GFT2=three times), it can be confirmed that lighter steering than that in the thick line can be realized. It is found that an increase in assist map gradual change gain GFT2 can lead to achieving the driver's steering intervention with light steering.

Further, according to each of the first to fifth forms of steering angle control described above, use of the steering-wheel vibration removing means 206 and the steering intervention compensating and steering-wheel vibration suppressing means 220 can lead to realizing steering-wheel vibration suppression during automatic steering. In order to validate this evidence, only steering angle control is performed without driver's steering intervention (steering wheel manual input torque Th=0 [Nm]), and relative merits and demerits in terms of steering wheel vibration during steering angle control in the autonomous driving state are compared. The description will be made as Example 2 (see FIG. 17 and FIG. 18). (The same applies to FIG. 19 to FIG. 23 where steering wheel manual input torque Th=0, and only steering angle control is performed.)

Example 2-1

Evidence for Solution to Problem 3

Figure 17A:
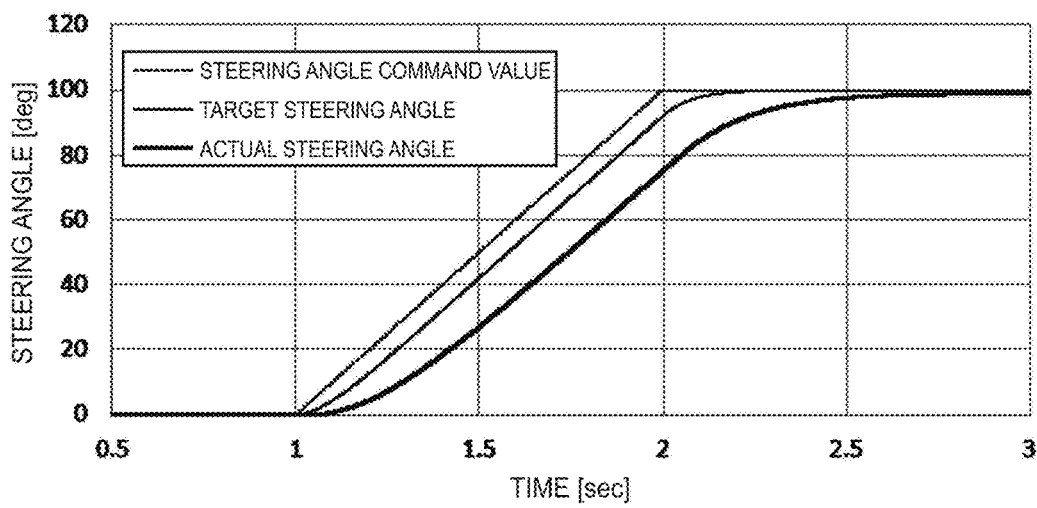
FIG. 17A is a graph illustrating time responses of steering angles when a steering angle command value is changed in a ramp state from 0 [deg] to 100 [deg].

First, FIG. 17A illustrates time responses when the steering angle command value is changed in a ramp state from 0 [deg] to 100 [deg]. As an example, states of respective responses of the target steering angle (thin line) and the actual steering angle (thick line) to the steering angle command value (dashed line) at the subsequent stage of the steering-wheel vibration removing means 206 are illustrated.

Figure 17B:
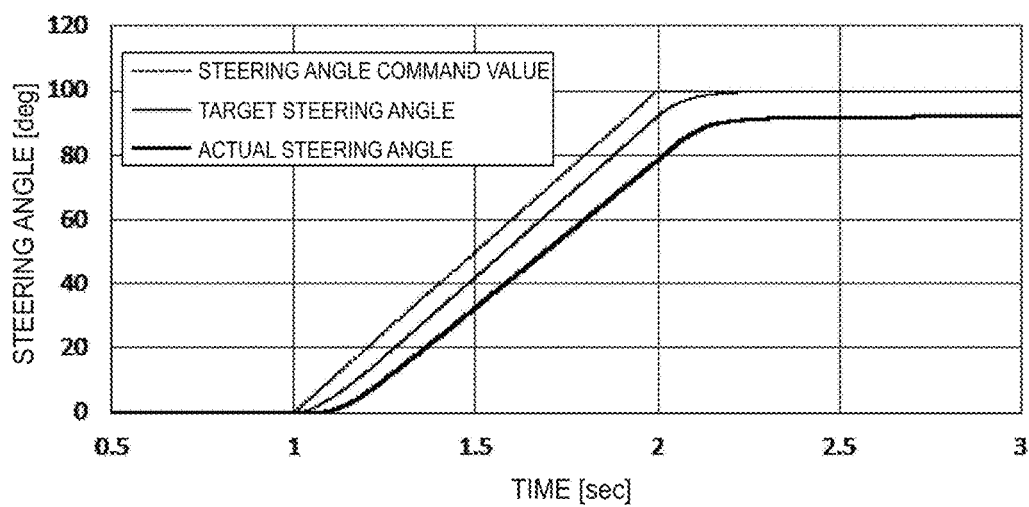
FIG. 17B a graph illustrating time responses of steering angles when the steering angle command value is changed in the ramp state from 0 [deg] to 100 [deg] in the case of P control.

Here, although a steady-state deviation is generated between the steering angle command value and the actual steering angle because of P control, there is no problem because the proportional gain Kvp is adjusted to be larger in a range to ensure the system stability (to validate the evidence in combination of phase compensation and gain in the steering-wheel vibration suppressing means), and compensation for the steady-state deviation is made in the steering angle command value generating section of the vehicle motion control section (see FIG. 17B).

Figure 18:
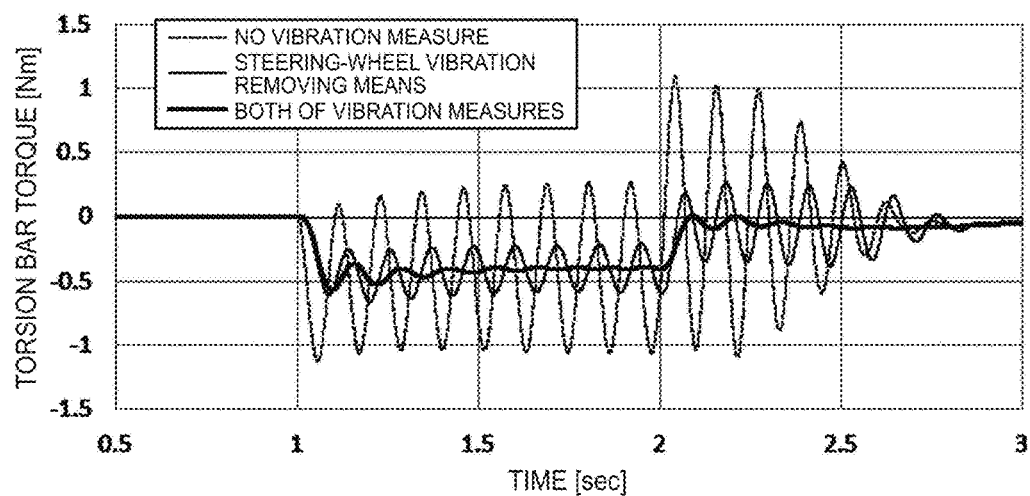
FIG. 18 is a graph illustrating time responses of torsion bar torques when steering angle control is performed on the steering angle command value.

Next, FIG. 18 illustrates time responses of the torsion bar torque to the same steering angle command value as mentioned upon steering angle control.

Dashed line . . . Absence of steering-wheel vibration removing means and absence of steering-wheel vibration suppressing means Thin line . . . Presence of steering-wheel vibration removing means and absence of steering-wheel vibration suppressing means Thick line . . . Presence of steering-wheel vibration removing means and presence of steering-wheel vibration suppressing means Note that a primary LPF cut-off frequency of 2 Hz is used in the steering-wheel vibration removing means 206, and a gain (corresponding to a torque of 5 Nm converted to that of the column shaft with respect to the torsion bar torque of 1 Nm) and the phase lead of primary phase compensation (a cut-off frequency of 2 Hz for the numerator and a cut-off frequency of 5 Hz for the denominator) are used in the steering intervention compensating and steering-wheel vibration suppressing means 220.

From this graph, the effects of the steering-wheel vibration removing means 206 and the steering intervention compensating and steering-wheel vibration suppressing means 220 are found, i.e., it is found that the vibration of the steering wheel is further suppressed by using both (see FIG. 18).

Example 2-2

Evidence for Solution to Problem 3

(Performance to Follow Steering Angle Command)

Figure 19:
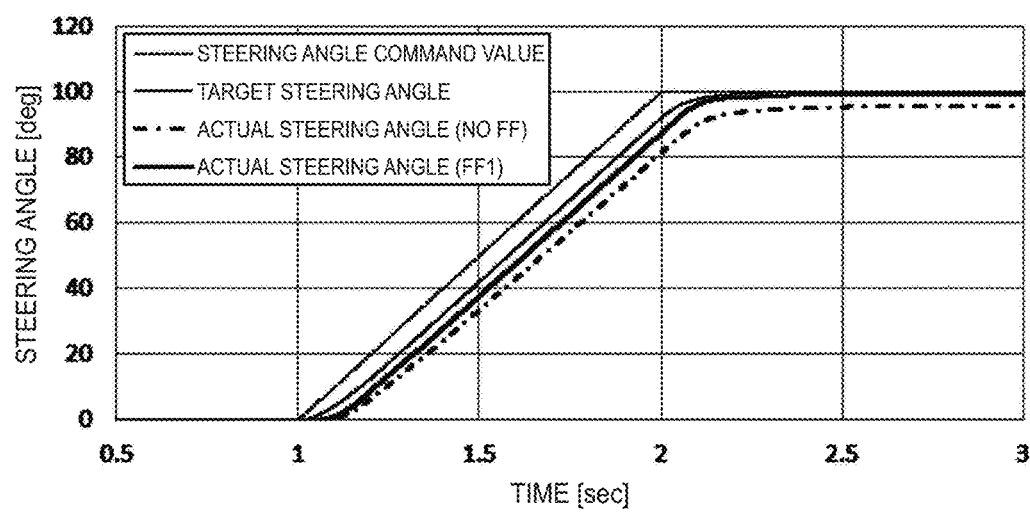
FIG. 19 is a graph illustrating time responses of steering angles when the steering angle command value is changed in the ramp state from 0 [deg] to 100 [deg] in Example 2-1.

FIG. 19 illustrates time responses when the steering angle command value is changed in the ramp state from 0 [deg] to 100 [deg]. As an example, states of respective responses of the target steering angle (thin line), the actual steering angle (thick line) with FF, and the actual steering angle (dot-dash line) without FF to the steering angle command value (dashed line) at the subsequent stage of the steering-wheel vibration removing means 206 are illustrated. Note that a primary phase-lead filter with a cut-off frequency of 0.2 Hz for the numerator, a cut-off frequency of 5 Hz, and the gain Kpf=0.2 are used as the FF filter 230. Compared with the absence of FF, the presence of FF improves the performance to follow the target steering angle.

(Effect of Reducing Steering Wheel Vibration)

Figure 20:
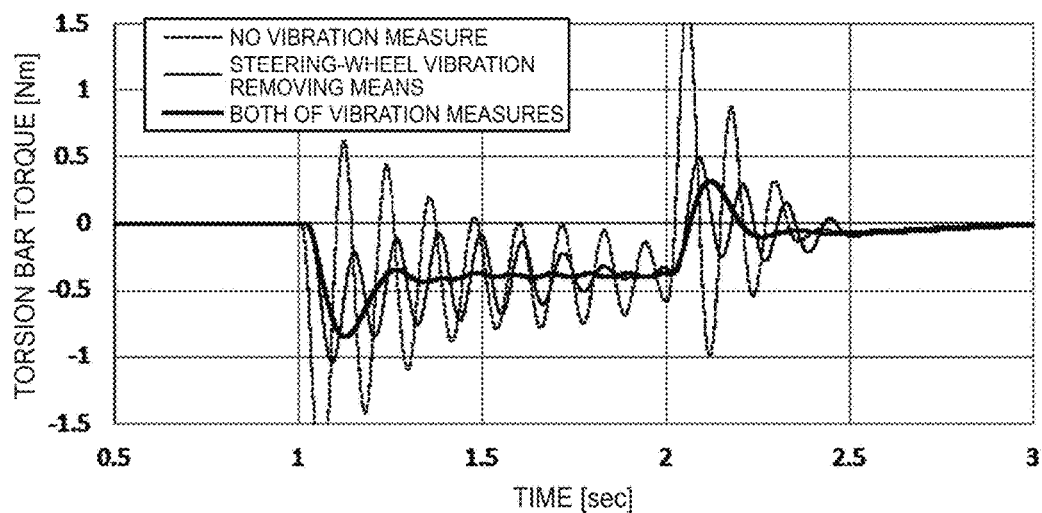
FIG. 20 is a graph illustrating time responses of torsion bar torques when steering angle control is performed on the steering angle command value in Example 2-1.
Figure 21:
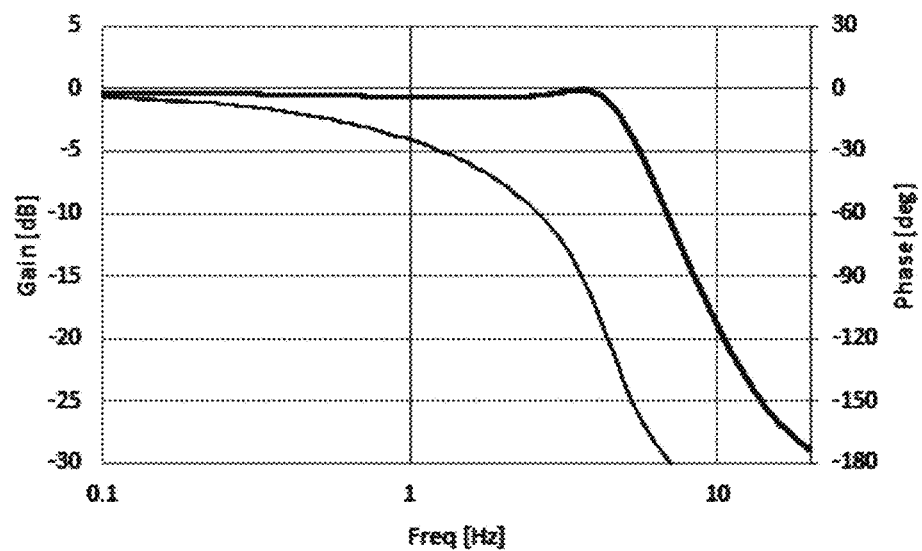
FIG. 21 is a diagram illustrating a transfer function Gθ (frequency response) from a target steering angle θt to an actual steering angle θr.

Next, FIG. 20 illustrates time responses of the torsion bar torque when steering angle control is performed on the same steering angle command value as mentioned above.

Dashed line . . . Absence of steering-wheel vibration removing means and absence of steering-wheel vibration suppressing means Thin line . . . Presence of steering-wheel vibration removing means and absence of steering-wheel vibration suppressing means Thick line . . . Presence of steering-wheel vibration removing means and presence of steering-wheel vibration suppressing means Note that a primary LPF cut-off frequency of 2 Hz is used in the steering-wheel vibration removing means 206, and a gain (corresponding to a torque of 5 Nm converted to that of the column shaft with respect to the torsion bar torque of 1 Nm) and the phase lead of primary phase compensation (a cut-off frequency of 2 Hz for the numerator and a cut-off frequency of 5 Hz for the denominator) are used in the steering intervention compensating and steering-wheel vibration suppressing means 220.

From this graph, the effects of the steering-wheel vibration removing means 206 and the steering intervention compensating and steering-wheel vibration suppressing means 220 are found, i.e., it is found that the vibration of the steering wheel is further suppressed by using both (see FIG. 20).

Example 3

In FIG. 8, a transfer function $G\theta$ (frequency response) from the target steering angle $\theta t$ to the actual steering angle $\theta r$ in a through state (state of gain=1) of the FF filter 230 is considered (see FIG. 21), where thick line: gain and thin line: phase. The transfer function $G\theta$ may be found from the mathematical expression of the plant model or by a typical identification method such as an experimental frequency response method.

In a method typically used in control theory, if an inverse transfer function of this transfer function $G\theta$ is used in the FF filter 230, the target steering angle $\theta t$ and the actual steering angle $\theta r$ will coincide with each other as the steering angle control follow-up performance in the FF filter 230 of Example 3.

Figure 22:
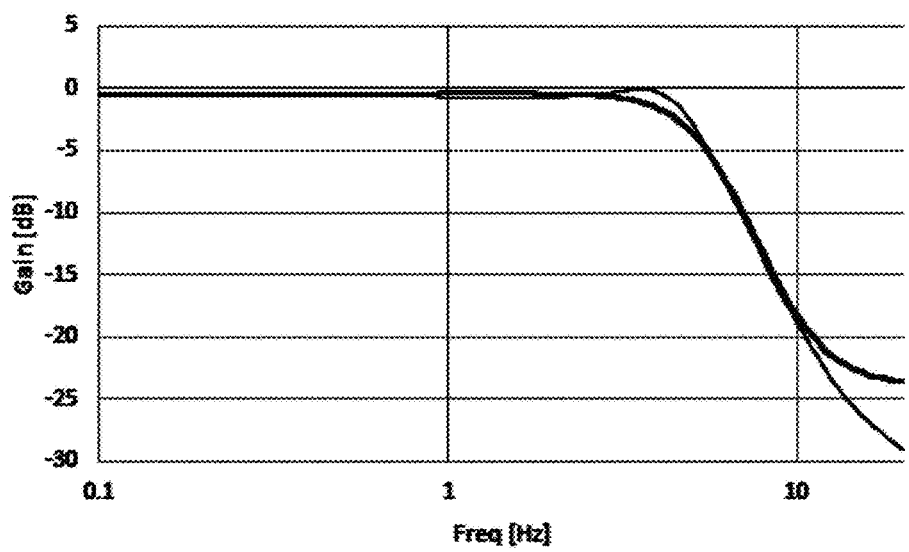
FIG. 22 is a Bode diagram illustrating the fitting results of frequency response gains using a secondary filter.

A Bode diagram as a result of fitting the gain of the above transfer function $G\theta$ is illustrated in FIG. 22 (where thin line: $G\theta$ and thick line: fitting result). Note that the fitting result is expressed by a quintic transfer function below.

$$G_{FIT} = \frac{b_5 s^5 + b_4 s^4 + b_3 s^3 + b_2 s^2 + b_1 s + b_0}{a_5 s^5 + a_4 s^4 + a_3 s^3 + a_2 s^2 + a_1 s + a_0} \quad [\text{Math. 7}]$$

$[b5, b4, b3, b2, b1, b0] =$ $1.0e+06 * [0.000000001711022 \quad 0.000000365522821$ $0.000039448300246 \quad 0.002478609805019$ $0.090668013717508 \quad 1.67554097535588]$ $[a5, a4, a3, a2, a1, a0] = 1.0e +$ $06 * [0.000000026525824 \quad 0.000003320000000$ $0.000208645315616 \quad 0.007649590856893$ -continued
0.162938496592083   1.76372734247987]

(Performance to Follow Steering Angle Command)

Figure 23:
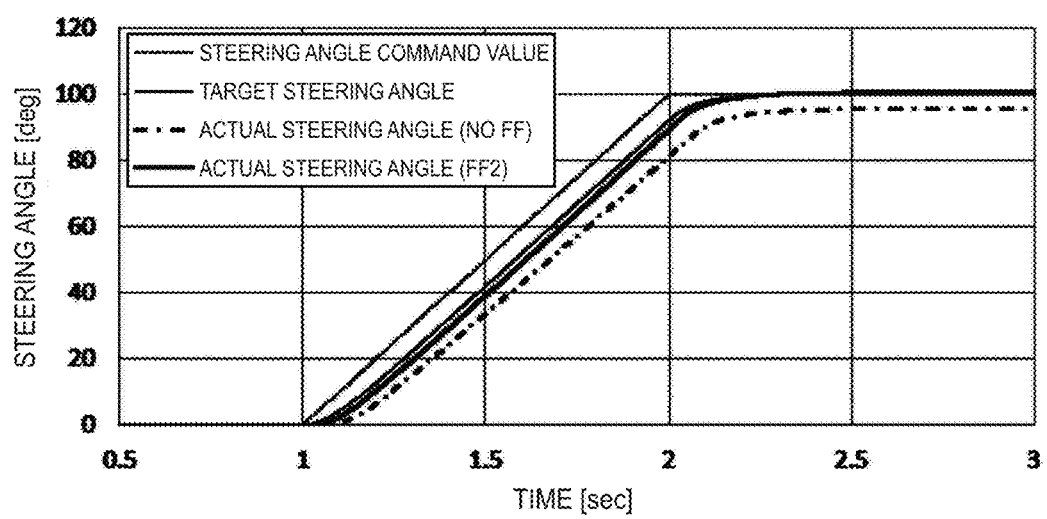
FIG. 23 is a graph illustrating time responses of steering angles when the steering angle command value is changed in the ramp state from 0 [deg] to 100 [deg] in Example 3.

The results of a simulation in which an inverse transfer function (the denominator and the numerator are replaced with each other) of the above GFIT is applied to the FF filter 230 are illustrated (see FIG. 23).

FIG. 23 illustrates time responses when the steering angle command value is changed in the ramp state from 0 [deg] to 100 [deg]. As an example, states of respective responses of the target steering angle (thin line), the actual steering angle (thick line) with FF, and the actual steering angle (dot-dash line) without FF o the steering angle command value (dashed line) at the subsequent stage of the steering-wheel vibration removing means 206 are illustrated. Note that a primary LPF (cut-off frequency 2 [Hz]) is applied to the steering-wheel vibration removing means 206. Compared with the absence of FF, the presence of FF can more follow the target steering angle, and this validates the effectiveness of the FF filter.

Example 4

Evidence for Solution to Problem 4

At the start of steering angle control (upon switching from assist control), the steering angular velocity command value ωref as output of the position control section is multiplied by the gradual change gain GFA3. This gradual change gain GFA3 is synchronous with the gradual change gain GFA1 by which the steering angle control electric current command value IrefP1 is multiplied. In addition, an upper and lower limit variable limiter is provided for the steering angular velocity command value ωref1 after being multiplied by the gradual change gain GFA3. This limiter can switch between the limit values for the steering angular velocity command value sequentially to limit the steering angular velocity command value in such a manner that the value is fixed at small value when the gradual change gain GFA3 is less than a set threshold value, and made larger gradually when the gradual change gain GFA3 is equal to or larger than the threshold value. The value is output to the steering angular velocity control section as the target steering angular velocity ωt. Further, a signal in a speed controller is multiplied by a gradual change gain GFA.

Figure 24:
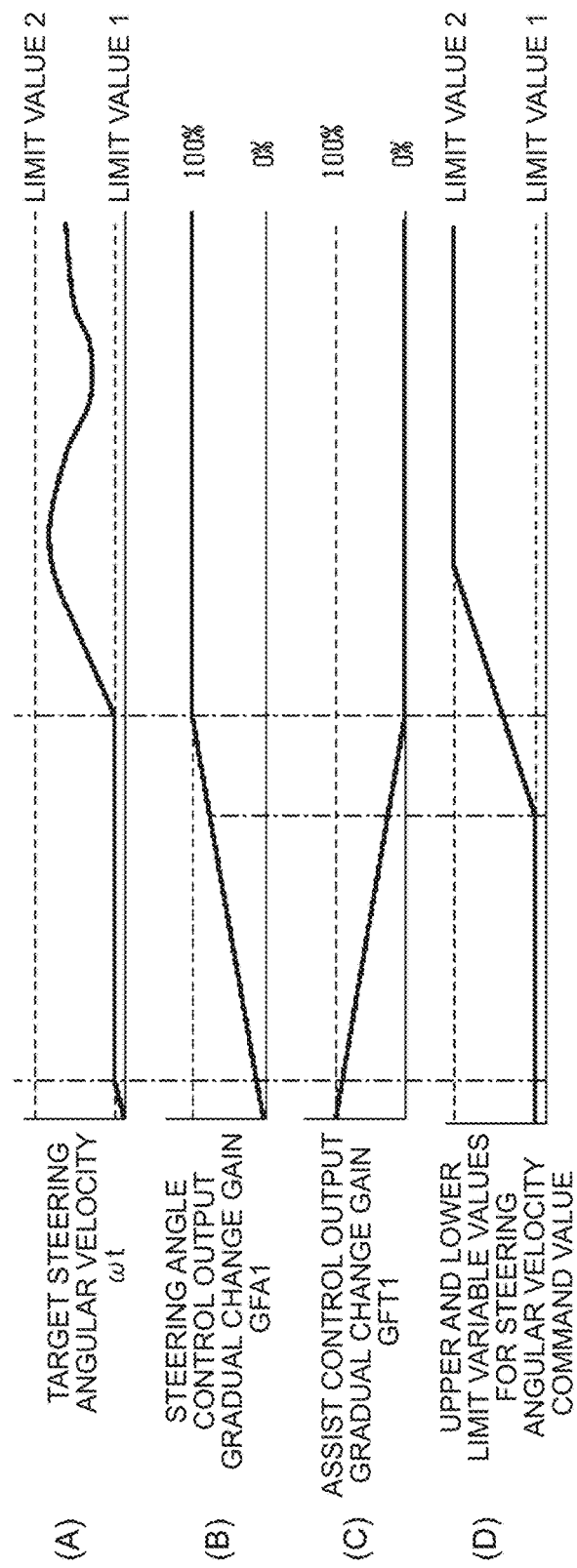
FIG. 24 is a graph illustrating (A) target steering angular velocity ωt, (B) steering angle control output gradual change gain GFA1, (C) assist control output gradual change gain GFT1, and (D) steering angular velocity command value upper and lower limit variable limiter values in Example 4, respectively.

As a result, the accumulation of excessive integral values in speed control is suppressed (in the case of PI control using proportion and pseudo-integration or in the case of PI control using phase-lag compensation and gain) or the generation of an excess electric current command value output from speed control is suppressed (in the case of proportional control) to reduce such an electric current command value as steering angle control output as to give the driver a feeling of strangeness. After the completion of gradual change, the steering angular velocity command value is not limited by the gradual change gain GFA3 and the upper and lower limit variable limiter, and the signal in speed control is not limited by the gradual change gain GFA2. Therefore, control can be shifted to normal steering angle control (in the embodiment, note that the speed control gradual change gain GFA2 and the speed command gradual change gain GFA3 are not illustrated in FIG. 24, and made to coincide with the steering angle control output gradual change gain GFA1). Thus, switching from assist control to steering angle control can also be performed smoothly without the feeling of strangeness given to the driver.

Figure 25:
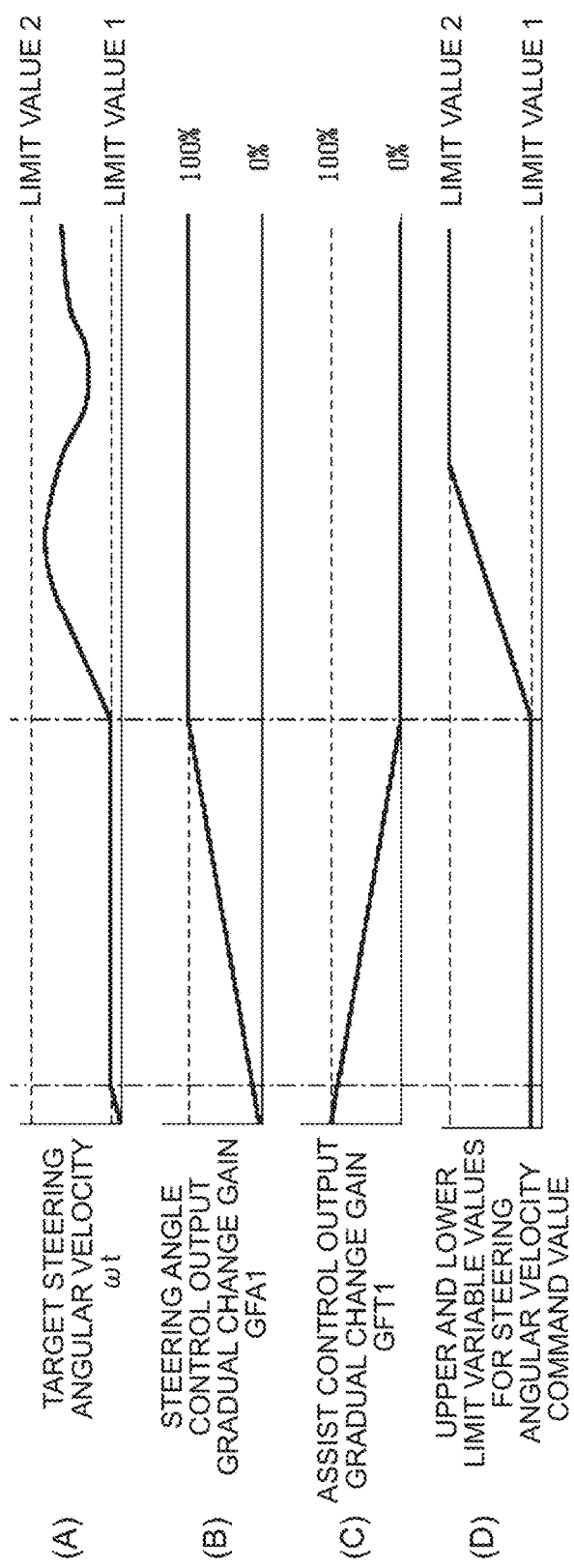
FIG. 25 is a graph illustrating (A) target steering angular velocity ωt, (B) steering angle control output gradual change gain GFA1, (C) assist control output gradual change gain GFT1, and (D) steering angular velocity command value upper and lower limit variable limiter values when the limiter values are switched after the steering angle control gradual change gain becomes 100%, respectively.

Further, in Example 4 described above, the results of switching limiter values when the steering angle control gradual change gain becomes 100% are illustrated in FIG. 25.

The electric power steering apparatus 100 according to the embodiment as described so far realizes a sophisticated human-machine interface upon autonomous driving of the vehicle. In other words, a control method is realized, in which manual steering is achieved even in a state without "manual input detection" and "switching operation" upon steering intervention by the driver during autonomous driving to ensure high safety at the time of emergency steering by the driver, thus balancing steering angle control and assist control. Upon switching from steering angle control to assist control, a feeling of strangeness and a feeling of discomfort given to the driver such as a sense of getting caught are also reduced. Further, switching from assist control to steering angle control is also performed smoothly without a feeling of strangeness.

The above-described embodiment is an example of preferred implementation of the present invention, but the present invention is not limited to the embodiment. Various modifications are possible without departing from the gist of the present invention. For example, in the above-described embodiment, the LPF is used in the steering-wheel vibration removing means 206, but this is just a preferred example. Alternatively, for example, a notch filter tailored to a vibrational frequency (around about 10 Hz) of the steering wheel may be used to reduce the component.

Further, in the above-described embodiment, primary phase-lead compensation is used in the steering intervention compensating and steering-wheel vibration suppressing means 220, but a secondary or higher-order phase compensation filter may also be used.

INDUSTRIAL APPLICABILITY

The present invention is preferably applied to electric power steering.

REFERENCE SIGNS LIST

1 . . . steering wheel
2 . . . column shaft (torsion bar)
3 . . . reduction gear
4a, 4b . . . universal joint
5 . . . pinion-rack mechanism
6a, 6b . . . tie rod
7a, 7b . . . hub unit
8L, 8R . . . steered wheel
10 . . . torque sensor
12 . . . vehicle speed sensor
14 . . . steering angle sensor
20 . . . motor
21 . . . rotation sensor
30 . . . control unit
31 . . . electric current command value calculating section
32A . . . addition section
32B . . . subtraction section
33 . . . electric current limiting section
34 . . . compensation section
35 . . . PI control section
36 . . . PWM control section
37 . . . inverter
38 . . . motor current detector 40 . . . CAN
100 . . . electric power steering apparatus
130 . . . vehicle-side ECU
130a . . . vehicle state quantity detector
131 . . . switching command section
132 . . . target steering angle generating section
134 . . . target trajectory calculating section
135 . . . vehicle motion control section
135a . . . steering angle command value generating section
140 . . . EPS (electric power steering apparatus) side ECU
141 . . . torque control section
142 . . . switching section
143 . . . electric current control/drive section
144 . . . motor angular velocity calculating section
145 . . . switching determination/gradual change gain generating section
146 . . . EPS state quantity detector
147 . . . assist control section
150 . . . motor
151 . . . rotation sensor
154 . . . torque sensor
160 . . . plant
200 . . . steering angle control section
202 . . . upper and lower limit variable limiter
204 . . . variable rate limiter
206 . . . steering-wheel vibration removing means
208 . . . position control section
210 . . . speed command value upper and lower limit variable limiter
212 . . . steering angular velocity control section
214 . . . steering angle control output upper and lower limit limiter
220 . . . steering intervention compensating and steering-wheel vibration suppressing means
230 . . . FF filter
341 . . . convergence
342 . . . inertia
343 . . . self-aligning torque (SAT)
344 . . . addition section
345 . . . addition section
CM . . . compensation signal
GFA1 . . . steering angle control output gradual change gain
GFA2 . . . speed control gradual change gain
GFA3 . . . speed command gradual change gain
GFA4 . . . steering angle command gradual change gain
GFT1 . . . assist control output gradual change gain
GFT2 . . . assist map gradual change gain
IrefP1 . . . steering angle control electric current command value
Th . . . steering torque
Vs . . . vehicle speed
θr . . . actual steering angle
θref . . . steering angle command value
θs . . . motor rotation angle
θt . . . target steering angle
ωref . . . steering angular velocity command value

What is claimed is:

1. An electric power steering apparatus comprising:
a motor that applies a steering assist force to a steering of a vehicle; and
a control unit (ECU) that generates a control signal for the steering according to a steering angle command value calculated based on a target trajectory of the vehicle, where the motor is driven by the steering angle command value to perform assist control on the steering of the vehicle, and mutually switch between an automatic steering control mode and a manual steering control mode,
wherein the ECU comprises:
a steering angle control section to which the steering angle command value is input to control a steering angle of the steering;
an assist control section that applies an auxiliary steering force to the steering using a rotational force of the motor; and
a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and
the steering angle control section comprises:
a position control section that multiplies a deviation between a target steering angle θt and an actual steering angle θr of the steering by a proportional gain, and further calculates a steering angular velocity command value ωref using a feedforward (FF) filter;
a steering angular velocity control section that calculates, by PI control using a pseudo-integration, an electric current command value for the motor based on input target steering angular velocity ωt and actual steering angular velocity ωr to make the actual steering angular velocity ωr follow the target steering angular velocity ωt; and
steering intervention compensating and steering-wheel vibration suppressing means that outputs, based on a steering torque upon driver's steering intervention, the electric current command value in a direction to release a twist of a torsion bar of the steering due to the steering intervention.

2. The electric power steering apparatus according to claim 1, wherein the steering angle control section further has steering-wheel vibration removing means that reduces a vibrational frequency component using a filter that reduces the steering-wheel vibrational frequency component, or by phase-lag compensation.

3. The electric power steering apparatus according to claim 1, wherein the steering angle control section further has an upper and lower limit variable limiter that limits the steering angular velocity command value ωref until completion of gradual change.

4. The electric power steering apparatus according to claim 1, wherein the ECU has the switching determination/gradual change gain generating section multiply a signal in the steering angular velocity control section by a speed control gradual change gain output to the steering angle control section.

5. The electric power steering apparatus according to claim 1, wherein the ECU has the switching determination/gradual change gain generating section multiply the steering angular velocity command value ωref by a speed command gradual change gain output to the steering angle control section.

6. The electric power steering apparatus according to claim 1, wherein the steering angle control section further has a variable rate limiter that performs rate limit processing on the steering angle command value to avoid an abrupt change in steering angle control electric current command value as steering angle control output due to an abrupt change in the steering angle command value θref.

7. The electric power steering apparatus according to claim 6, wherein the ECU has the switching determination/gradual change gain generating section multiply a steering angle command value from the variable rate limiter by a steering angle command gradual change gain output to the steering angle control section.

8. The electric power steering apparatus according to claim 1, wherein the ECU further has an assist control section to which an assist map gradual change gain is input to output assist control output, and multiplies the output of the assist control section by an assist control output gradual change gain GFT1.

9. An electric power steering apparatus comprising:
a motor that applies a steering assist force to a steering of a vehicle; and
a control unit (ECU) that generates a control signal for the steering according to a steering angle command value calculated based on a target trajectory of the vehicle, where
the motor is driven by the steering angle command value to perform assist control on the steering of the vehicle, and mutually switch between an automatic steering control mode and a manual steering control mode,
wherein the ECU comprises:
a steering angle control section to which the steering angle command value is input to control a steering angle of the steering;
an assist control section that applies an auxiliary steering force to the steering using a rotational force of the motor; and
a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and
the steering angle control section comprises:
a position control section that multiplies a deviation between a target steering angle θt and an actual steering angle θr of the steering by a proportional gain, and further calculates a steering angular velocity command value ωref using a feedforward (FF) filter;
a steering angular velocity control section that calculates, by control using a proportional gain Kv and phase-lag compensation, an electric current command value for the motor based on input target steering angular velocity ωt and actual steering angular velocity ωr to make the actual steering angular velocity ωr follow the target steering angular velocity ωt; and
steering intervention compensating and steering-wheel vibration suppressing means that outputs, based on a steering torque upon driver's steering intervention, the electric current command value in a direction to release a twist of a torsion bar of the steering due to the steering intervention.

10. The electric power steering apparatus according to claim 9, wherein the steering angle control section further has steering-wheel vibration removing means that reduces a vibrational frequency component using a filter that reduces the steering-wheel vibrational frequency component, or by phase-lag compensation.

11. The electric power steering apparatus according to claim 9, wherein the steering angle control section further has an upper and lower limit variable limiter that limits the steering angular velocity command value ωref until completion of gradual change.

12. The electric power steering apparatus according to claim 9, wherein the ECU has the switching determination/gradual change gain generating section multiply a signal in the steering angular velocity control section by a speed control gradual change gain output to the steering angle control section.

13. The electric power steering apparatus according to claim 9, wherein the ECU has the switching determination/gradual change gain generating section multiply the steering angular velocity command value ωref by a speed command gradual change gain output to the steering angle control section.

14. The electric power steering apparatus according to claim 9, wherein the steering angle control section further has a variable rate limiter that performs rate limit processing on the steering angle command value to avoid an abrupt change in steering angle control electric current command value as steering angle control output due to an abrupt change in the steering angle command value θref.

15. The electric power steering apparatus according to claim 14, wherein the ECU has the switching determination/gradual change gain generating section multiply a steering angle command value from the variable rate limiter by a steering angle command gradual change gain output to the steering angle control section.

16. The electric power steering apparatus according to claim 9, wherein the ECU further has an assist control section to which an assist map gradual change gain is input to output assist control output, and multiplies the output of the assist control section by an assist control output gradual change gain GFT1.

17. An electric power steering apparatus comprising:
a motor that applies a steering assist force to a steering of a vehicle; and
a control unit (ECU) that generates a control signal for the steering according to a steering angle command value calculated based on a target trajectory of the vehicle, where
the motor is driven by the steering angle command value to perform assist control on the steering of the vehicle, and mutually switch between an automatic steering control mode and a manual steering control mode, wherein
the ECU comprises:
a steering angle control section to which the steering angle command value is input to control a steering angle of the steering;
an assist control section that applies an auxiliary steering force to the steering using a rotational force of the motor; and
a switching determination/gradual change gain generating section that generates a gradual change gain, by which the steering angle control output and assist control output are multiplied, and multiplies the gradual change gain to make a switching determination between a steering angle control mode by the steering angle control section and an assist control mode by the assist control section, and the steering angle control section comprises:
a position control section that multiplies a deviation between a target steering angle θt and an actual steering angle θr of the steering by a proportional gain, and further calculates a steering angular velocity command value ωref using a feedforward (FF) filter;

a steering angular velocity control section that calculates, by proportional control, an electric current command value for the motor based on input target steering angular velocity ωt and actual steering angular velocity ωr to make the actual steering angular velocity ωr follow the target steering angular velocity ωt; and steering intervention compensating and steering-wheel vibration suppressing means that outputs, based on a steering torque upon driver's steering intervention, the electric current command value in a direction to release a twist of a torsion bar of the steering due to the steering intervention.

18. The electric power steering apparatus according to claim 17, wherein the steering angle control section further has steering-wheel vibration removing means that reduces a vibrational frequency component using a filter that reduces the steering-wheel vibrational frequency component, or by phase-lag compensation.

19. The electric power steering apparatus according to claim 17, wherein the steering angle control section further has an upper and lower limit variable limiter that limits the steering angular velocity command value ωref until completion of gradual change.

20. The electric power steering apparatus according to claim 17, wherein the ECU has the switching determination/gradual change gain generating section multiply a signal in the steering angular velocity control section by a speed control gradual change gain output to the steering angle control section.

21. The electric power steering apparatus according to claim 17, wherein the ECU has the switching determination/gradual change gain generating section multiply the steering angular velocity command value ωref by a speed command gradual change gain output to the steering angle control section.

22. The electric power steering apparatus according to claim 17, wherein the steering angle control section further has a variable rate limiter that performs rate limit processing on the steering angle command value to avoid an abrupt change in steering angle control electric current command value as steering angle control output due to an abrupt change in the steering angle command value θref.

23. The electric power steering apparatus according to claim 22, wherein the ECU has the switching determination/gradual change gain generating section multiply a steering angle command value from the variable rate limiter by a steering angle command gradual change gain output to the steering angle control section.

24. The electric power steering apparatus according to claim 17, wherein the ECU further has an assist control section to which an assist map gradual change gain is input to output assist control output, and multiplies the output of the assist control section by an assist control output gradual change gain GFT1.

* * * * *